(12) United States Patent
Willden et al.

(10) Patent No.: US 11,897,209 B2
(45) Date of Patent: Feb. 13, 2024

(54) COMPOSITE FORMING APPARATUS, SYSTEM AND METHOD

(71) Applicant: The Boeing Company, Chicago, IL (US)

(72) Inventors: Kurtis S. Willden, Kent, WA (US); Marc R. Matsen, Seattle, WA (US)

(73) Assignee: The Boeing Company, Arlington, VA (US)

( * ) Notice: Subject to any disclaimer, the term of this patent is extended or adjusted under 35 U.S.C. 154(b) by 111 days.

(21) Appl. No.: 17/460,835

(22) Filed: Aug. 30, 2021

(65) Prior Publication Data

US 2023/0060515 A1   Mar. 2, 2023

(51) Int. Cl.
| | |
|---|---|
| *B29C 35/00* | (2006.01) |
| *B29C 70/00* | (2006.01) |
| *B29C 70/34* | (2006.01) |
| *B29C 35/08* | (2006.01) |
| *B29C 70/38* | (2006.01) |
| *B29L 31/30* | (2006.01) |

(52) U.S. Cl.
CPC ........ *B29C 70/342* (2013.01); *B29C 35/0805* (2013.01); *B29C 70/388* (2013.01); *B29C 2035/0811* (2013.01); *B29L 2031/3076* (2013.01)

(58) Field of Classification Search
CPC ..... B29C 35/00; B29C 35/08; B29C 35/0805; B29C 70/00; B29C 70/30; B29C 70/34; B29C 70/342; B29C 70/38; B29C 70/388
See application file for complete search history.

(56) References Cited

U.S. PATENT DOCUMENTS

| | | | |
|---|---|---|---|
| 4,990,213 A | * | 2/1991 | Brown .................. B29C 70/545 156/499 |
| 5,387,098 A | | 2/1995 | Willden |
| 5,705,794 A | | 1/1998 | Gillespie et al. |
| 5,728,309 A | | 3/1998 | Matsen et al. |
| 5,747,179 A | | 5/1998 | Matsen et al. |
| 5,793,024 A | | 8/1998 | Matsen et al. |
| 5,914,064 A | | 6/1999 | Gillespie et al. |
| 6,040,563 A | | 3/2000 | Matsen et al. |
| 6,087,640 A | | 7/2000 | Gillespie et al. |
| 6,180,932 B1 | | 1/2001 | Matsen et al. |

(Continued)

FOREIGN PATENT DOCUMENTS

| | | |
|---|---|---|
| EP | 3 034 271 | 6/2016 |
| JP | 2003-103554 | 4/2003 |
| JP | 2006-335049 | 12/2006 |

OTHER PUBLICATIONS

European Patent Office, Extended European Search Report, App. No. 22178137.0 (dated Dec. 14, 2022).
Solvay: P720X Release file (Mar. 21, 2013).

*Primary Examiner* — Jacob T Minskey
*Assistant Examiner* — Matthew Hoover
(74) *Attorney, Agent, or Firm* — Walters & Wasylyna LLC

(57) ABSTRACT

A composite forming apparatus includes an end effector, a forming feature that is coupled to the end effector, and a heating element that is coupled to the forming feature to heat the forming feature. The end effector moves the forming feature relative to a composite ply to form the composite ply over a forming tool or over a prior formed composite ply. The forming feature heats the composite ply via conduction.

20 Claims, 15 Drawing Sheets

(56) References Cited

U.S. PATENT DOCUMENTS

| | | |
|---|---|---|
| 6,211,497 B1 | 4/2001 | Matsen et al. |
| 6,528,771 B1 | 3/2003 | Matsen et al. |
| 6,566,635 B1 | 5/2003 | Matsen et al. |
| 6,653,608 B1 | 11/2003 | Matsen et al. |
| 6,747,253 B1 | 6/2004 | Firth et al. |
| 6,814,916 B2 | 11/2004 | Willden et al. |
| 6,884,975 B2 | 4/2005 | Matsen et al. |
| 6,884,976 B2 | 4/2005 | Matsen et al. |
| 6,914,225 B2 | 7/2005 | Fischer et al. |
| 7,118,370 B2 | 10/2006 | Willen et al. |
| 7,137,182 B2 | 11/2006 | Nelson |
| 7,651,650 B2 | 1/2010 | Willden et al. |
| 8,017,059 B2 | 9/2011 | Matsen et al. |
| 8,142,181 B2 | 3/2012 | Willden et al. |
| 8,236,222 B2 | 8/2012 | Henderson et al. |
| 8,336,596 B2 | 12/2012 | Nelson et al. |
| 8,372,327 B2 | 2/2013 | Matsen et al. |
| 8,383,998 B1 | 2/2013 | Matsen et al. |
| 8,410,409 B1 | 4/2013 | Matsen et al. |
| 8,480,823 B1 | 7/2013 | Matsen et al. |
| 8,556,619 B2 | 10/2013 | Matsen et al. |
| 8,578,995 B2 | 11/2013 | Nelson |
| 8,708,691 B2 | 4/2014 | Matsen et al. |
| 8,808,490 B2 | 8/2014 | Hagman et al. |
| 8,884,201 B2 | 11/2014 | Matsen et al. |
| 8,963,058 B2 | 2/2015 | Matsen et al. |
| 8,980,029 B1 | 3/2015 | Nigro et al. |
| 9,314,975 B1 | 4/2016 | Matsen et al. |
| 9,469,408 B1 | 10/2016 | Elangovan et al. |
| 9,510,398 B1 | 11/2016 | Miller et al. |
| 9,586,362 B2 | 3/2017 | Matsen et al. |
| 9,610,654 B1 | 4/2017 | Matsen et al. |
| 9,635,714 B2 | 4/2017 | Matsen et al. |
| 9,635,715 B1 | 4/2017 | Miller et al. |
| 9,656,829 B2 | 5/2017 | Hagman et al. |
| 9,663,247 B2 | 5/2017 | Rotter et al. |
| 9,820,339 B2 | 11/2017 | Matsen et al. |
| 9,868,249 B2 | 1/2018 | Matsen et al. |
| 10,000,026 B2 | 6/2018 | Matsen et al. |
| 10,018,175 B2 | 7/2018 | Marcoe et al. |
| 10,058,950 B1 | 8/2018 | Gerken et al. |
| 10,086,596 B2 | 10/2018 | Desjardien et al. |
| 10,219,329 B2 | 2/2019 | Matsen et al. |
| 10,377,084 B2 | 8/2019 | Matsen et al. |
| 10,442,120 B2 | 10/2019 | Matsen et al. |
| 10,456,960 B2 | 10/2019 | Chapman et al. |
| 10,464,240 B2 | 11/2019 | Matsen et al. |
| 10,654,199 B2 | 5/2020 | Matsen et al. |
| 10,688,697 B2 | 6/2020 | Sundquist et al. |
| 10,701,767 B2 | 6/2020 | Matsen et al. |
| 10,703,027 B2 | 7/2020 | Matsen et al. |
| 10,743,377 B2 | 8/2020 | Matsen et al. |
| 10,756,501 B2 | 8/2020 | Chen et al. |
| 10,792,842 B2 | 10/2020 | Matsen et al. |
| 10,899,081 B2 | 1/2021 | Matsen et al. |
| 10,994,450 B2 | 5/2021 | Matsen et al. |
| 2005/0053762 A1 | 3/2005 | Willden et al. |
| 2006/0291991 A1 | 12/2006 | Willden et al. |
| 2010/0043941 A1 | 2/2010 | Henderson et al. |
| 2011/0247751 A1* | 10/2011 | Steyer ............... B29C 66/83421 492/46 |
| 2014/0102625 A1* | 4/2014 | De Mattia ............. B29C 70/384 156/437 |
| 2016/0368226 A1 | 12/2016 | Encinosa et al. |
| 2020/0016797 A1 | 1/2020 | Chapman et al. |

\* cited by examiner

COMPOSITE FORMING APPARATUS, SYSTEM AND METHOD

FIELD

The present disclosure relates generally to composite manufacturing and, more particularly, to apparatuses, systems, and methods for ply-by-ply forming of composite parts.

BACKGROUND

Formed composite structures are commonly used in applications where light weight and high strength are desired, such as in aircraft and vehicles. Often, these applications utilize contoured parts that must be formed and then cured. Conventional formation of composite structures, particularly relatively large composite structures or composite structures having a complex contour, requires extensive manual labor prior to curing. For example, composite fiber plies (e.g., pre-impregnated fiber plies or dry fabric) are laid by hand over a shaped forming tool or mandrel. The part is then cured, often by heating and pressure. The resulting part matches the shape of the forming tool. However, layup of the fiber plies is time consuming and laborious. Additionally, fiber plies can be difficult to manipulate when being formed over the forming tool. Accordingly, those skilled in the art continue with research and development efforts in the field of composite manufacturing.

SUMMARY

Disclosed are examples of an apparatus for forming a composite, a system for forming a composite, a method for forming a composite, and a composite structure. The following is a non-exhaustive list of examples, which may or may not be claimed, of the subject matter according to the present disclosure.

In an example, the disclosed composite forming apparatus includes an end effector, a forming feature that is coupled to the end effector, and a heating element that is coupled to the forming feature to heat the forming feature. The end effector moves the forming feature relative to a composite ply to form the composite ply over a forming tool or over a prior formed composite ply. The forming feature heats the composite ply via conduction.

In an example, the disclosed composite forming system includes a movement mechanism, the composite forming apparatus that is coupled to the movement mechanism, and a forming tool that includes a forming surface. The movement mechanism selectively positions the composite forming apparatus relative to the forming surface of the forming tool. A heating element heats a forming feature. The forming feature heats a composite ply via conduction before the composite ply is formed over the forming tool or over a prior formed composite ply using the forming feature.

In an example, the disclosed method is for forming a composite laminate on a forming tool using the composite forming apparatus.

In an example, the disclosed composite structure is formed on a forming tool using the composite forming apparatus.

In another example, the disclosed composite forming system includes a movement mechanism, an end effector that is coupled to the movement mechanism, a forming feature that is coupled to the end effector, and a heating element that is coupled to the forming feature. The end effector selectively moves the forming feature relative to a composite ply to apply a compaction force to the composite ply. The movement mechanism selectively moves the end effector relative to the composite ply to form a portion of the composite ply over a portion of a forming tool or over at least a portion of a prior formed composite ply using the forming feature. The heating element heats the forming feature. Heat is transferred from the forming feature to the composite ply via conduction.

In another example, the disclosed method is for forming a composite laminate on a forming tool using the composite forming system.

In another example, the disclosed composite structure is formed on a forming tool using the composite forming system.

In another example, the disclosed method includes steps of: (1) positioning a composite ply over a forming tool or over a prior formed composite ply; (2) positioning a forming feature in contact with the composite ply using an end effector; (3) heating the forming feature using a heating element that is coupled to the forming feature; (4) heating a portion of the composite ply via conduction using the forming feature; and (5) forming the portion of the composite ply over a portion of the forming tool or over at least a portion of the prior formed composite ply using the forming feature while heating the portion of the composite ply using the forming feature.

In another example, the disclosed method includes steps of: (1) placing a composite ply over a forming tool or over a prior formed composite ply, located on the forming tool; (2) compressing a portion of the composite ply against the forming tool or against the prior formed composite ply located on the forming tool; (3) locally heating the portion of the composite ply being compressed via conduction; and (4) forming the portion of the composite ply over a portion of the forming tool or over at least a portion of the prior formed composite ply while compressing and locally heating the portion of the composite ply.

In another example, the disclosed composite apparatus is operated according to the method.

In another example, the disclosed composite structure is formed according to the method.

In another example, the disclosed composite structure includes at least one layer of a composite ply. The at least one layer of the composite ply is formed over a forming tool or over a prior formed composite ply, located on the forming tool, to fabricate a composite laminate. A portion of the composite ply is heated by a forming feature of a composite forming apparatus via conduction while the portion of the composite ply is formed over a portion of the forming tool or over at least a portion of the prior formed composite ply using the forming feature. The composite laminate is cured to form the composite structure.

Other examples of the disclosed composite forming apparatus, composite forming system, method for forming a composite, and composite structure will become apparent from the following detailed description, the accompanying drawings, and the appended claims.

DETAILED DESCRIPTION

Referring generally to FIGS. 1-12, by way of examples, the present disclosure is directed to a composite forming apparatus 100 and a composite forming system 300 for forming a composite on a forming tool during a composite manufacturing operation. Referring generally to FIGS. 1-12 and particularly to FIG. 13, by way of examples, the present disclosure is also directed to a method 1000 for forming a composite on a forming tool during a composite manufacturing operation. In one or more examples, implementations of the composite forming apparatus 100, the composite forming system 300 and the method 1000 are utilized to individually lay down a number of composite plies on a forming tool to form a composite laminate on the forming tool, which is subsequently cured on the forming tool to form a composite structure.

Figure 1:
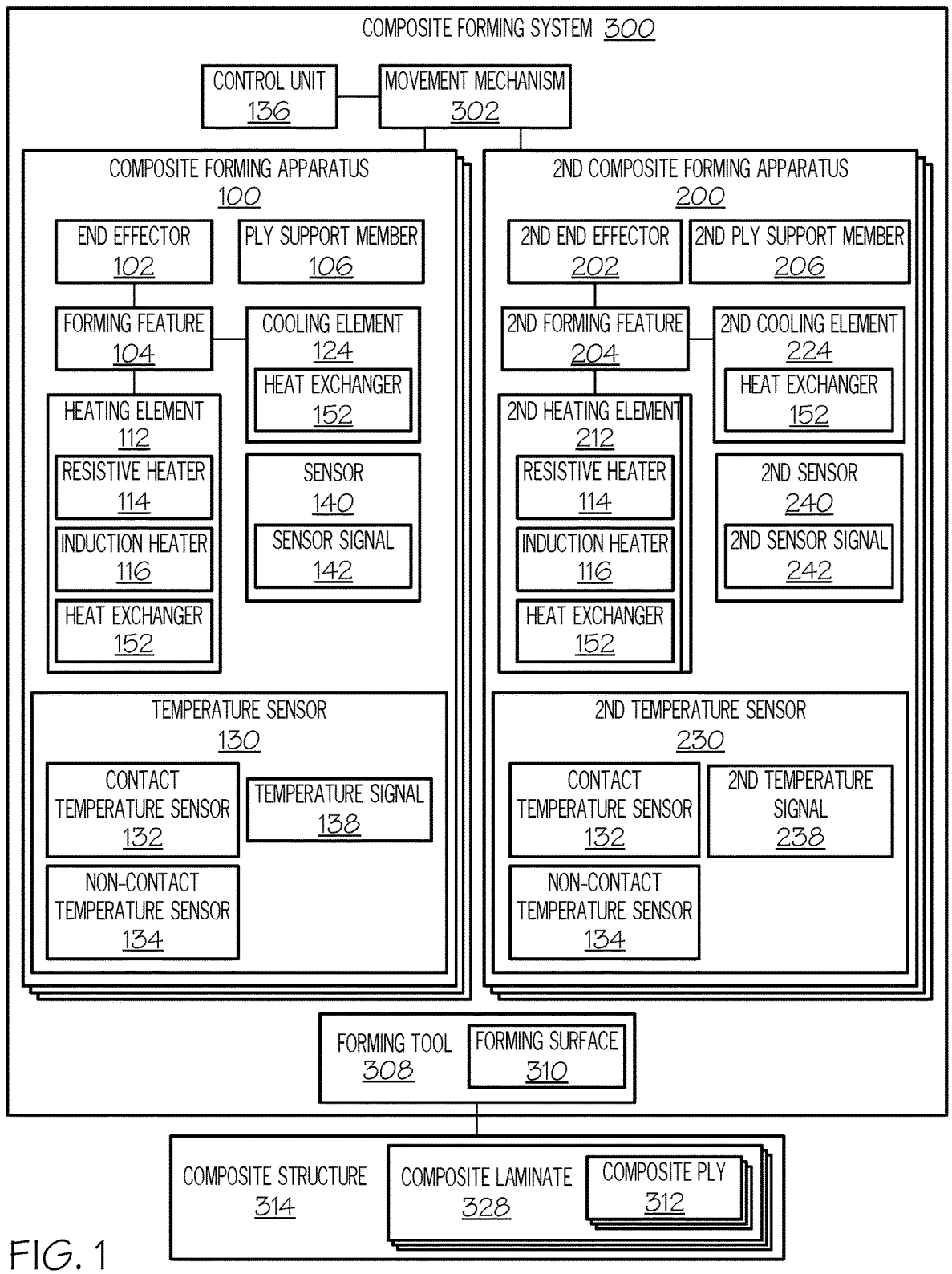
FIG. 1 is a schematic block diagram of an example of a composite forming system.

Referring to FIG. 1, examples of the composite forming apparatus 100 and the composite forming system 300 enable automated, or at least partially automated, fabrication of a composite laminate 328 on a forming tool 308. The composite laminate 328 is then cured through the application of heat and/or pressure (e.g., using an oven or autoclave) to manufacture a composite structure 314. More particularly, examples of the composite forming apparatus 100 and the composite forming system 300 enable automated, or at least partially automated, compaction and formation of at least one composite ply 312 over a forming surface 310 of the forming tool 308 for manufacture of the composite laminate 328.

For the purpose of the present disclosure, the term "composite ply 312" generally refers to a composite ply that forms at least a portion of the composite laminate 328 and/or that is being actively heated and formed using the composite forming apparatus 100 and/or composite forming system 300. As will be described in greater detail herein, a plurality of composite plies may be successively heated and formed to fabricate the composite laminate 328 on the forming tool 308. In one or more examples, a first composite ply may be formed directly on the forming surface 310 of the forming tool 308, a second composite ply may be formed on the first composite ply, a third composite ply may be formed on the second composite ply, and so forth in succession until completion of the composite laminate 328. As such, for the purpose of the present disclosure, the term "prior formed composite ply 312-1" (e.g., as shown in FIG. 3) refers to a composite ply that has been previously heated and formed, whether directly on the forming surface 310 or on an underling, previously formed composite ply. Accordingly, as described herein, the composite ply 312 may be formed on the forming surface 310 of the forming tool 308 (e.g., as shown in FIG. 2) or may be formed on the prior formed composite ply 312-1.

Automation of the ply formation process and/or laminate formation process can provide a reduction in processing time, a reduction in labor and costs, and/or a reduction of process variations (e.g., human error) that may lead to undesired inconsistencies in the finished composite structure as compared to conventional composite fabrication. In one or more implementations, the composite forming apparatus 100 and the composite forming system 300 enable ply-by-ply application (e.g., layup) of composite material (e.g., pre-preg, dry fiber, multi-axial non-crimp fabric, etc.) to fabricate the composite laminate 328 on the forming tool 308. In one or more implementations, the composite forming apparatus 100 and the composite forming system 300 enable full thickness forming of a pre-collated stack of composite plies. Following layup, the composite laminate 328 is cured, for example, on the forming tool 308, to form the composite structure 314. Ply-by-ply forming facilitates fabrication of large composite structures, thick composite structures and/or composite structures with complex shapes. Ply-by-ply formation can also provide a reduction in buckling or wrinkling of plies within the composite structure as compared to conventional composite fabrication.

In one particular implementation, the disclosed composite forming apparatus 100, composite forming system 300, and method 1000 facilitate heat setting of a carbon fiber material during a hot drape shear forming operation. As such, in one or more examples, the composite forming apparatus 100 and/or the composite forming system 300 may be, or take the form of, a hot drape shear forming machine. In one or more examples, the principles described herein are applicable to fabrics with a thermoplastic fabric layer, fabric with a thermally sensitive layer disposed between structural layers, and/or fabric that is infused with a matrix binder material.

Figure 2:
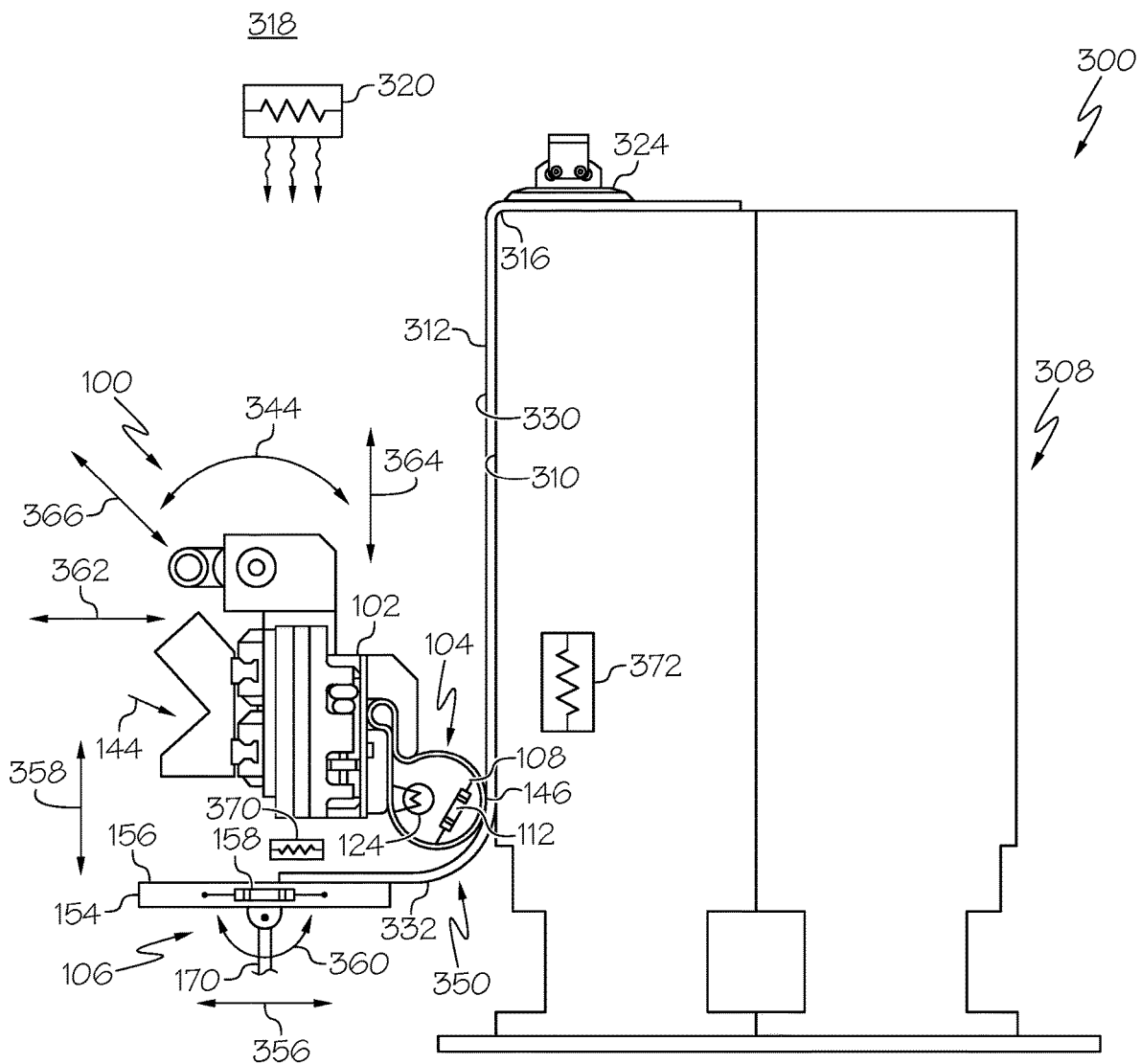
FIG. 2 is a schematic, elevational view of an example of a portion of the composite forming system.
Figure 3:
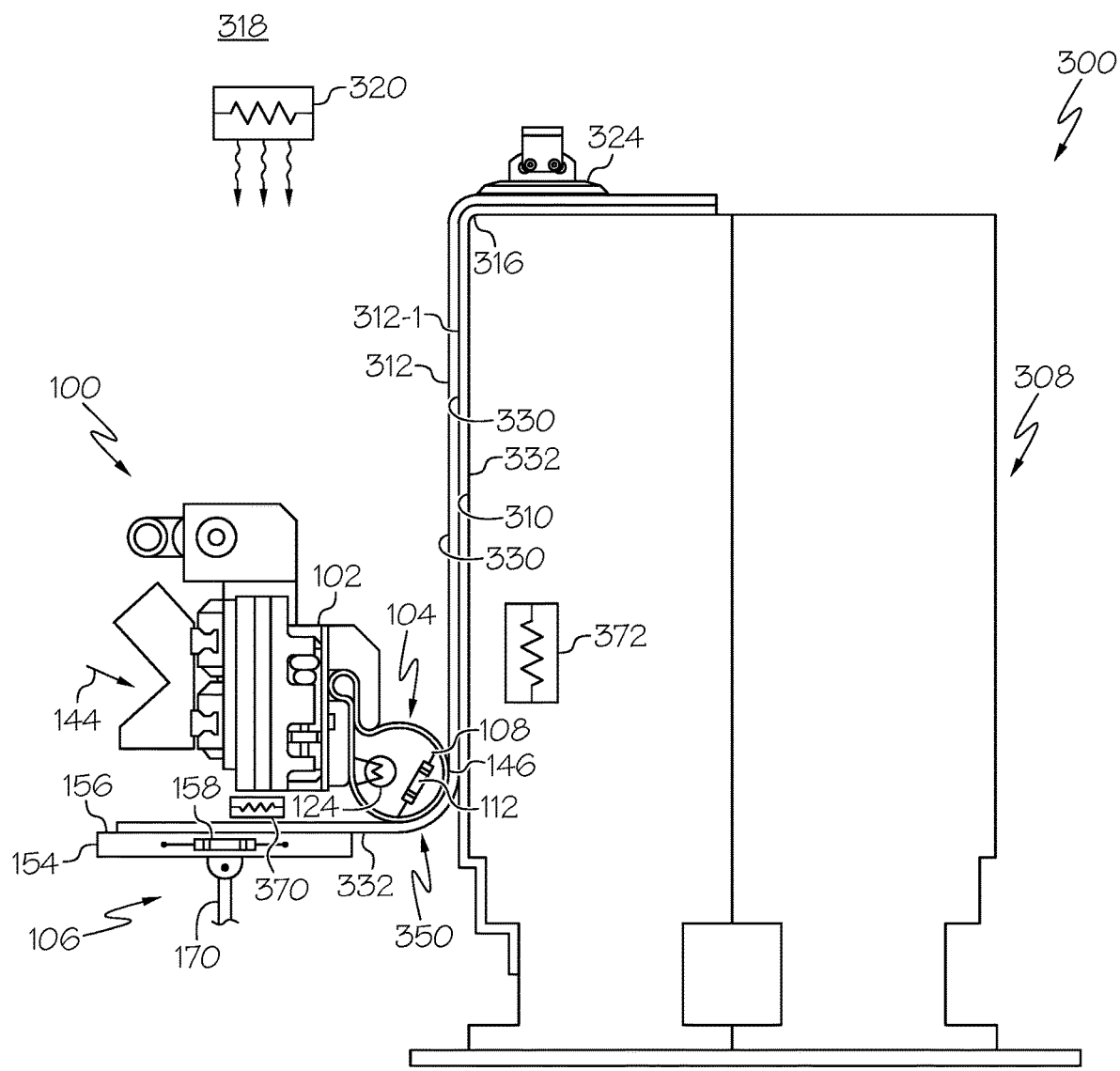
FIG. 3 is a schematic, elevational view of an example of a portion of the composite forming system.

Referring to FIGS. 1-3, the composite forming apparatus 100 and composite forming system 300 operate to compact (e.g., apply pressure of force to) and form (e.g., manipulate) the composite ply 312 on or over the forming surface 310 of the forming tool 308 or on or over the prior formed composite ply 312-1. Additionally, the composite forming apparatus 100 and composite forming system 300 operate to directly transfer heat to a localized region of (e.g., locally heat) the composite ply 312 that is being compacted and formed.

In one or more examples, the composite forming apparatus 100 and composite forming system 300 directly heat a localized region of the composite ply 312 immediately before and/or during compaction and formation of the composite ply 312. For example, the composite forming apparatus 100 and composite forming system 300 preheat a portion of the composite ply 312 to a forming temperature prior to compacting and forming the portion of the composite ply 312 over the forming surface 310 of the forming tool 308 or over the prior formed composite ply 312-1.

The forming temperature to which the composite ply 312 is heated may depend upon a number of factors including, but not limited to, the type of composite material being used (e.g., pre-preg, a dry preform, multi-axial non-crimp fabric, unidirectional tape, etc.), the geometry of the forming tool 308, and other process constraints. Generally, the forming temperature is greater than room temperature and less than a cure temperature for the composite laminate 328. Heating the composite ply 312 softens the composite ply 312 and prepares the composite ply 312 for manipulation over the forming surface 310 of the forming tool 308, which improves the ability of the composite ply 312 to conform to the shape of the forming tool 308.

In one or more examples, the composite forming apparatus 100 and composite forming system 300 then apply a compaction force 144 (e.g., as shown in FIGS. 2 and 3) evenly across the composite ply 312 to form the composite ply 312 over the forming surface 310 of the forming tool 308 or over the prior formed composite ply 312-1. The composite forming apparatus 100 moves along the composite ply 312 at varying and/or selectively controlled speeds, pressures, and/or angles to accommodate various geometries of the forming tool 308, which shapes the composite ply 312 and reduces or eliminates bubbles, wrinkles, or other inconsistencies and nonconformities. Heating the composite ply 312 immediately before and/or during compaction and formation increases the adhesion, or tackiness, of the composite ply 312, which improves the ability of the composite ply 312 to stay in place on the forming surface 310 or on the prior formed composite ply 312-1 (e.g., an underlying composite ply that was previously formed).

In one or more examples, the composite ply 312 includes or refers to a single ply of a composite material, which forms one layer of thickness of the composite laminate 328. In other examples, the composite ply 312 includes or refers to multiple plies (e.g., a stack) of the composite material, which form a plurality of layers of a partial thickness of the composite laminate 328. In yet other examples, the composite ply 312 includes or refers multiple plies of the composite material or a pre-collated stack of plies of composite material, which form a full thickness of the composite laminate 328. Accordingly, throughout the present disclosure, the phrase "composite ply" may refer to a number of plies or a number of layers of the composite material that form a portion of or an entirety of the thickness of the composite laminate 328, unless explicitly stated otherwise. The composite ply 312 may also be referred to as a composite patch, a composite preform, or a composite charge.

The composite material may take the form of any one of various suitable types of composite material having any one of various ply angles or fiber orientations. The forming apparatus 100, the forming system 300 and the method 1000 are used to heat and form the composite ply 312.

In one or more examples, the composite material includes a fiber reinforcement, also referred to as a dry fabric. In these examples, the composite laminate 328 is formed of a number of composite plies 312 of the dry fiber reinforcement, also referred to a dry preform). In one or more examples, the forming apparatus 100, the forming system 300 and the method 1000 are used to heat the composite ply 312, which includes the dry fiber reinforcement having a thermoplastic or thermoset veil or thermoplastic or thermoset knit. In these examples, the composite laminate 328 is consolidated, for example, on the forming tool 308. Following layup and consolidation, the composite laminate 328 is then infused with a matrix material (e.g., resin) and cured. The composite laminate 328 may be infused with the matrix material and/or cured on the forming tool 308 or may be transferred to a dedicated tool for matrix infusion and/or cure.

In a particular example, the composite ply 312 is a multi-axial non-crimp fabric that includes a thermoplastic veil and a thermoplastic knit stitch. In one or more examples, the multi-axial non-crimp fabric includes multiple layers of fiber stacked in multiple fiber orientations with a toughing veil placed between each layer. The multiple layers are held together with a knit thread. Other examples of the multi-axial non-crimp fabric may omit the veil. In another examples, the multi-axial non-crimp fabric may include a binder material. The multi-axial non-crimp fabric may have as few as one fiber orientation or may have multi axial orientations, such as up to eight fiber orientations with some orientations being replicated. Application of heat to the composite ply 312 immediately before and/or during compaction and formation of the composite ply 312 softens the thermoplastic veil to improve formability of the composite ply 312. Application of heat to the composite ply 312 immediately before and/or during compaction and formation of the composite ply 312 also softens or melts the knit stitch and increases the tackiness of the thermoplastic veil to improve adhesion of the composite ply 312 to the forming surface 310 of the forming tool 308 or to the prior formed composite ply 312-1 (e.g., another composite ply that has been previously formed on the forming tool 308). For example, heating the composite ply 312 helps to tack the composite ply 312 into the desired shape after forming. Additionally, heating the composite ply 312 may increases drapability or the ability to form the composite ply 312 to the forming tool 308 or the prior formed composite ply 312-1.

In one or more examples, the composite material includes a fiber reinforcement that is impregnated with the matrix material, also referred to as a pre-preg or a wet preform. In these examples, the composite laminate 328 is formed by laminating a number of composite plies 312 of the pre-preg, such as multiple courses of unidirectional composite tape, which are impregnated with a resin matrix. In one or more examples, the forming apparatus 100, the forming system 300 and the method 1000 are used to heat the composite ply 312 including the pre-preg composite material to a temperature in the range of approximately 350° F. (176° C.) for thermoset pre-preg composite materials or up to approximately 800° F. (426° C.) for thermoplastic pre-preg composite materials. Application of heat to the composite ply 312 immediately before and/or during compaction and formation of the composite ply 312 changes (e.g., increases) the viscosity of the resin matrix present in the composite ply 312 to be formed, thereby making forming to the forming surface 310 more accurate and/or increasing the tack of the composite ply 312 to be formed to the forming surface 310 or the prior formed composite ply 312-1. Heating the composite ply 312 also increases drapability or the ability to form the composite ply 312 to the forming tool 308 or the prior formed composite ply 312-1. It can be appreciated that there is relatively narrow window between too little heat and too much heat and it is desirable to not trigger full melting or curing of the composite ply 312 during the forming process.

The composite laminate 328 is formed on the forming tool 308. The composite laminate 328 includes or is formed from a number of composite plies 312. Additionally, in one or more examples, the composite laminate 328 is cured on the forming tool 308 to fabricate the composite structure 314.

Accordingly, in one or more examples, the forming tool 308 is a dual-purpose tool, which serves as a layup tool (e.g., mandrel) and a cure tool.

In other examples, the forming tool 308 serves only as a layup tool or mandrel. In these examples, after fabrication of the composite laminate 328, the composite laminate 328 is transferred from the forming tool 308 to a dedicated cure tool (not shown). The composite laminate 328 is then cured on the cure tool to fabricate the composite structure 314.

The forming tool 308 defines a shape of the composite laminate 328 formed on the forming tool 308 and, thus, a shape of the composite structure 314 cured on the forming tool 308. In an example, the forming surface 310 corresponds to and defines a shape of an inner mold line (IML) surface the composite laminate 328. In these examples, the composite forming apparatus 100 shapes an outer mold line (OML) surface of each composite ply 312 in succession until eventually the composite laminate 328 is completed. In another example, the forming surface 310 corresponds to and defines a shape of the outer mold line (OML) surface of the composite laminate 328. In these examples, the composite forming apparatus 100 shapes the inner mold line (IML) surface of each composite ply 312 in succession until eventually the composite laminate 328 is completed.

In one or more examples, the forming tool 308 has any one of various shapes depending on the composite structure 314 being manufactured. As an example, the forming tool 308 is a stringer forming tool and the composite structure 314 is a composite stringer. As another example, the forming tool 308 is a spar forming tool and the composite structure 314 is a composite spar. As another example, the forming tool 308 is a panel forming tool and the composite structure 314 is a composite panel.

Referring still to FIGS. 1-3, in one or more examples, the composite forming apparatus 100 actively heats the composite ply 312 via conduction while compacting and forming the composite ply 312 over the forming surface 310 of the forming tool 308 or over the prior formed composite ply 312-1. In one or more examples, the composite forming apparatus 100 includes an end effector 102, a forming feature 104, and a heating element 112. The forming feature 104 is coupled to the end effector 102. The heating element 112 is coupled to the forming feature 104. The heating element 112 heats the forming feature 104. The end effector 102 moves the forming feature 104 relative to the composite ply 312 to form the composite ply 312 over the forming surface 310 of the forming tool 308 or over the prior formed composite ply 312-1. In one or more examples, the forming feature 104 presses and/or sweeps the composite ply 312 against the forming surface 310 of the forming tool 308 (e.g., as shown in FIG. 2). In one or more examples, the forming feature 104 presses and/or sweeps the composite ply 312 against the prior formed composite ply 312-1 (e.g., as shown in FIG. 3). The forming feature 104 actively heats the composite ply 312 via conduction. The forming feature 104 heats the composite ply 312 before and/or while the composite ply 312 is formed over the forming surface 310 of the forming tool 308 or over the prior formed composite ply 312-1.

In one or more examples, the end effector 102 is selectively movable (e.g., linearly, rotationally, and/or off-axis) relative to the forming tool 308 to position the forming feature 104 relative to the forming tool 308. The forming feature 104 moves with the end effector 102. As such, movement of end effector 102 sweeps the forming feature 104 along the composite ply 312 to form the composite ply 312 over the forming surface 310 of the forming tool 308 (e.g., as shown in FIG. 2) or over the prior formed composite ply 312-1 (e.g., as shown in FIG. 3).

Referring to FIGS. 2 and 3, in one or more examples, the end effector 102 is linearly movable along one or more axes (e.g., translates along a horizontal axis and/or a vertical axis). As an example, the end effector 102 linearly moves (e.g., horizontally) toward and away from the forming tool 308 (e.g., as illustrated by directional arrow 362 in FIG. 2) while the composite ply 312 is being laid down (e.g., formed and compacted). As another example, end effector 102 linearly moves (horizontally) along a length of the forming tool 308 while the composite ply 312 is being laid down. As another example, the end effector 102 linearly moves (e.g., vertically) along a height of the forming tool 308 (e.g., as illustrated by directional arrow 364 in FIG. 2) while the composite ply 312 is being laid down. As another example, the end effector 102 linearly moves (e.g., off-axis) relative to the forming tool 308 (e.g., as illustrated by directional arrow 366 in FIG. 2) while the composite ply 312 is being laid down.

In one or more example, the end effector 102 is rotationally movable along one or more axes (e.g., rotates about a horizontal axis and/or a vertical axis). As an example, the end effector 102 rotationally moves (e.g., about a horizontal axis) relative to the forming tool 308 (e.g., as illustrated by directional arrow 344 in FIG. 2) while the composite ply 312 is being laid down.

Referring again to FIGS. 1-3, in one or more examples, the heating element 112 is in direct thermal communication with the forming feature 104 to heat the forming feature 104. In one or more examples, the heating element 112 is located within the forming feature 104.

In one or more examples, the forming feature 104 includes a body 108 and an interface surface 146 (e.g., as shown in FIGS. 2 and 3). The body 108 takes the form of any forming member suitable for or capable of forming the composite ply 312 over the forming surface 310 or over the prior formed composite ply 312-1 and compacting the composite ply 312 against the forming surface 310 or against the prior formed composite ply 312-1. The interface surface 146 contacts the composite ply 312 during compaction and formation of the composite ply 312.

In one or more examples, the heating element 112 is located inside of the body 108. In one or more examples, the heating element 112 is situated in or is coupled to an interior of the body 108. For example, the body 108 may be formed of a laminate of material layers and the heating element 112 is located between material layers of the laminate. Other configurations and constructions of the body 108 of the forming feature 104 and the heating element 112 are also contemplated.

Referring to FIG. 1, in one or more examples, the heating element 112 is, includes, or takes the form of a resistive heater 114. The resistive heater 114 enables rapid and efficient heating and simple temperature control. The resistive heater 114 includes a resistive heating element that is coupled to the forming feature 104 (e.g., within the body 108). Electrical current passing through the resistive heating element results in heating of the resistive heater 114. Examples of the resistive heater 114 (e.g., the resistive heating element) include, but are not limited to, metallic resistance wire, ceramic heating elements, semiconductors, thick film heaters, conductive PTC rubber (e.g., polydimethylsiloxane (PDMS) loaded with carbon nanoparticles), and the like.

Referring still to FIG. 1, in one or more examples, the heating element 112 is, includes, or takes the form of an induction heater 116. The induction heater 116 enables rapid, constant, and efficient heating and precise temperature control. The induction heater 116 includes a conductor (e.g., electrically conducting material) coupled to the forming feature 104 (e.g., within the body 108), an electromagnet, and an electronic oscillator that passes high-frequency alternative current through the electromagnet. A rapidly alternating magnetic field penetrates the conductor and generates electric currents inside the conductor, which heat it by Joule heating.

Referring still to FIG. 1, in one or more examples, the heating element 112 is, includes, or takes the form of a heat exchanger 152. The heat exchanger 152 utilizes a gas or liquid to heat the forming feature 104.

Figure 4:
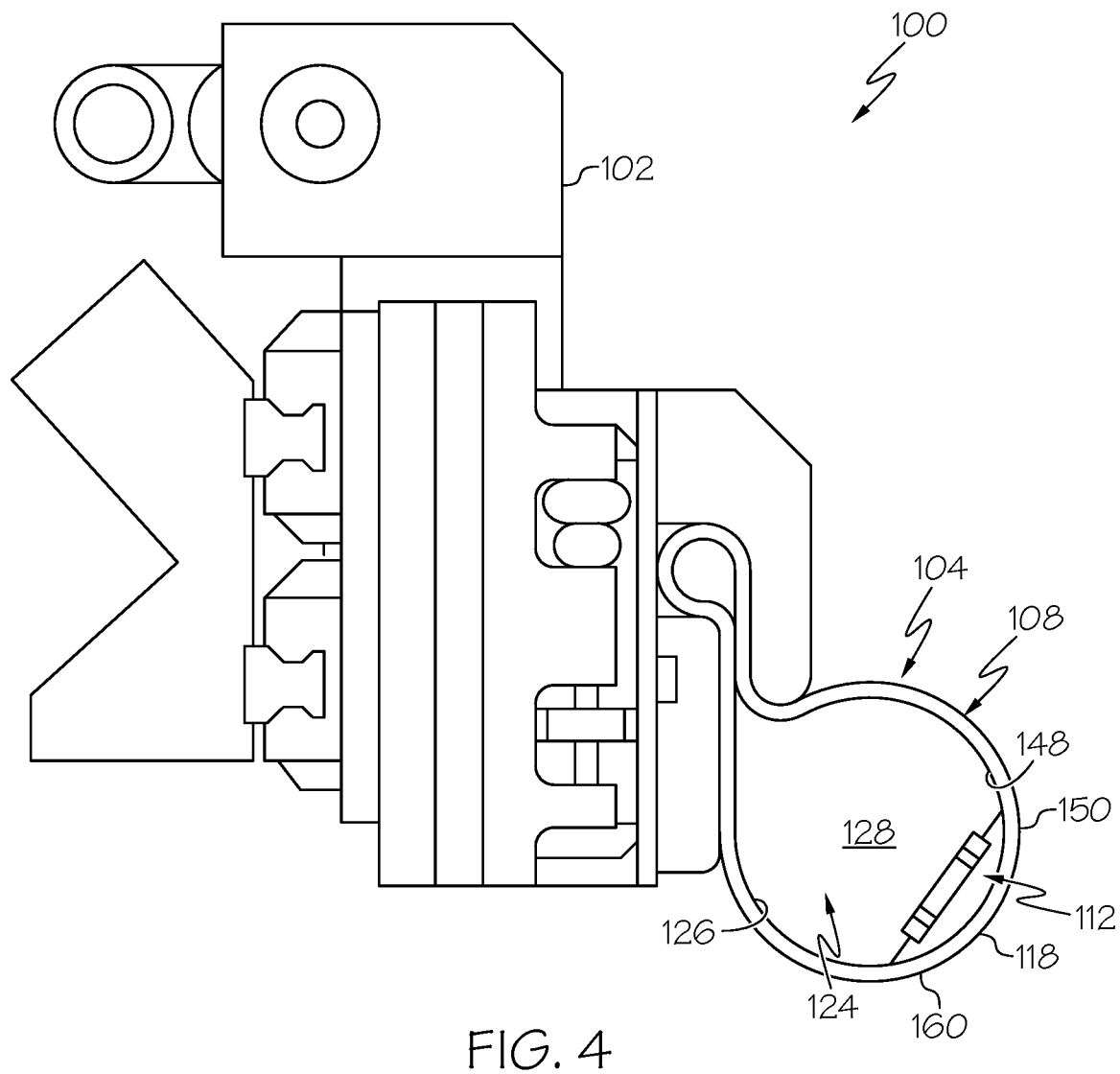
FIG. 4 is a schematic, elevational view of an example of a portion of a composite forming apparatus of the composite forming system.
Figure 5:
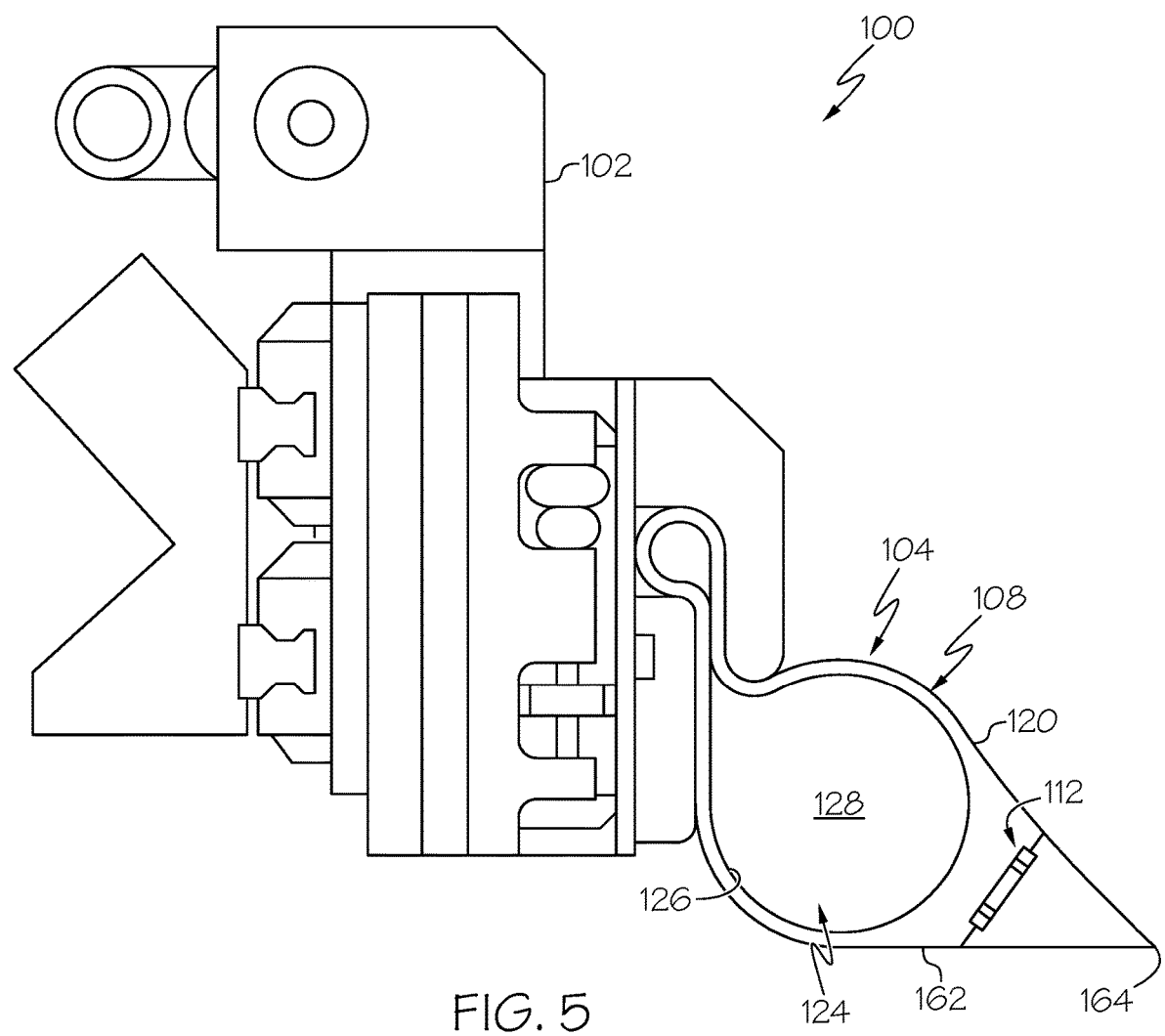
FIG. 5 is a schematic, elevational view of an example of a portion of a composite forming apparatus of the composite forming system.
Figure 6:
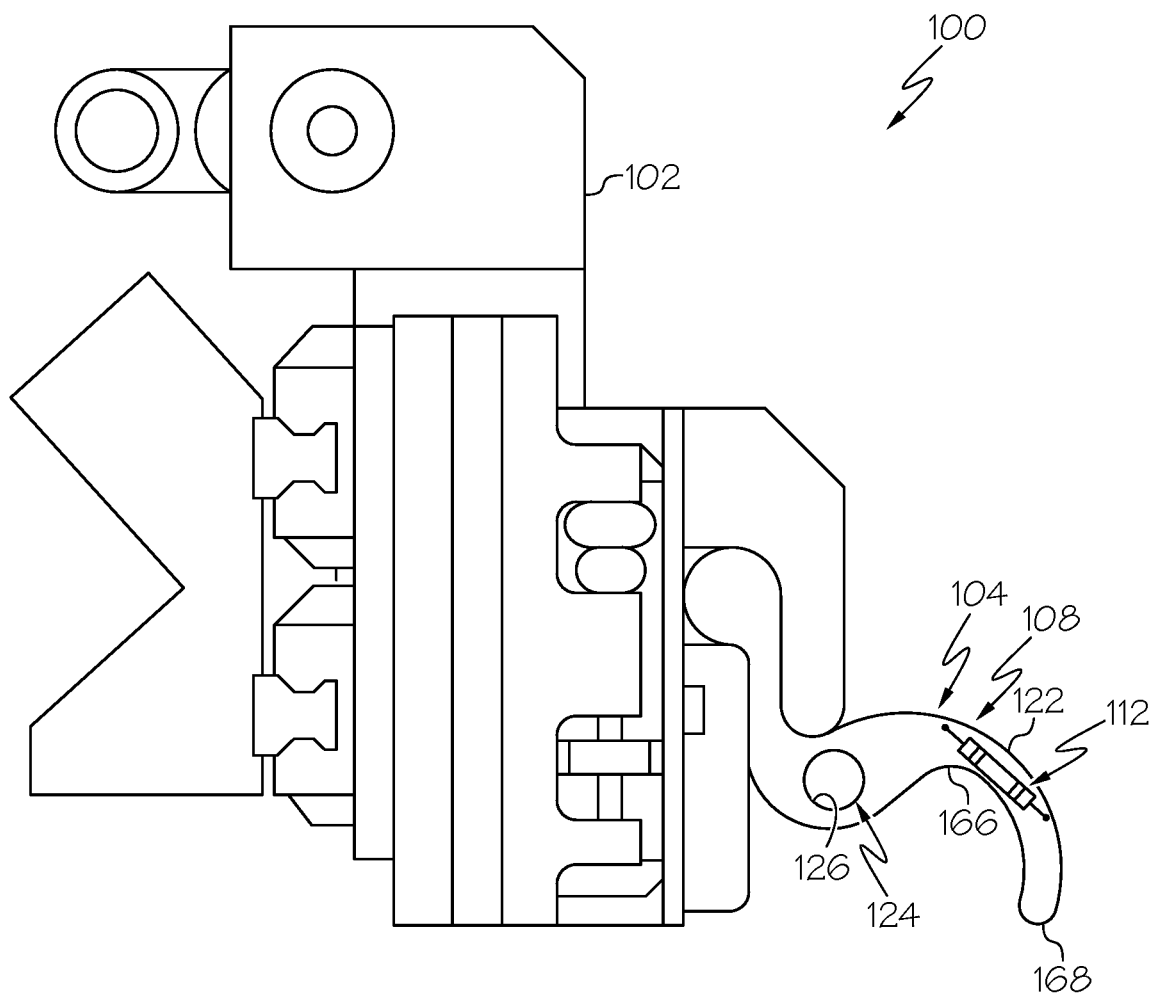
FIG. 6 is a schematic, elevational view of an example of a portion of a composite forming apparatus of the composite forming system.

Referring to FIGS. 4-6, in one or more examples, the heating element 112 (e.g., the heat exchanger 152) includes, or takes the form of, a channel 126 that extends through the forming feature 104 (e.g., the body 108) and a fluid 128 that passes through the channel 126. Heat is transferred to the body 108 of the forming feature 104 from the fluid 128 flowing through channel 126 formed through the body 108 and then from the body 108 of the forming feature 104 to the composite ply 312. The fluid 128 may be a gas (e.g., air) or a liquid (e.g., water). In one or more examples, the fluid 128 is heated.

In other examples, the heating element 112 is any one of various other types of suitable heaters.

For the purpose of the present disclosure, the phrases laying down the composite ply 312, laying up the composite ply 312, and similar terms generally refer to positioning (e.g., placing) the composite ply 312 on the forming tool 308 or on the prior formed composite ply 312-1, forming the composite ply 312 over the forming surface 310 or over the prior formed composite ply 312-1, and/or compacting the composite ply 312 against the forming surface 310 or against the prior formed composite ply 312-1. Generally, laying up refers to a composite laminate being laid-up via the act of building up the composite laminate (e.g., a "lay-up") in a ply-by-ply manner. Generally, laying down refers to a composite laminate being laid down via the act of laying a piece of a ply or plies down onto a surface of a tool or mold or down on previous laid down ply.

As such and unless explicitly stated otherwise, for the purpose of the present disclosure, the phrases laying down the composite ply 312 on the forming tool 308, laying up the composite ply 312 on the forming tool 308, positioning (e.g., placing) the composite ply 312 on the forming tool 308, forming the composite ply 312 over the forming tool 308, compacting the composite ply 312 against the forming tool 308, and similar phrases include: (1) a situation where the composite ply 312 is an initial composite ply that is positioned, compacted, and or formed directly on the forming surface 310 of the forming tool 308 (e.g., as shown in FIG. 2); or (2) a situation where the composite ply 312 is a subsequent or successive composite ply that is positioned, compacted, and/or formed on the prior formed composite ply 312-1 (e.g., an underlaying composite ply that has been previously positioned, formed, and/or compacted on the forming tool 308) (e.g., as shown in FIG. 3).

Referring to FIG. 2, the composite ply 312 includes a first ply surface 330 and a second ply surface 332 that is opposite to the first ply surface 330. In one or more examples, at a beginning of the forming process, the composite ply 312 is placed or positioned on or over the forming tool 308 such that at least a portion of the second ply surface 332 of the composite ply 312 is in contact with at least a portion of the forming surface 310 of the forming tool 308. The forming feature 104 is positioned in contact with the first ply surface 330. The forming feature 104 moves across the first ply surface 330 of the composite ply 312 to sweep a portion 350 of the composite ply 312 over a portion of the forming surface 310. As the forming feature 104 sweeps the portion 350 of the composite ply 312 over the forming surface 310, the forming feature 104 heats the portion 350 of the composite ply 312, compacts the portion 350 of the composite ply 312 against the forming surface 310, and forms the portion 350 of the composite ply 312 over the forming surface 310.

The above process is repeated a number of times to lay down a number of composite plies 312 to fabricate the composite laminate 328 (e.g., as shown in FIG. 1) on the forming tool 308.

Referring to FIG. 3, in one or more examples, after forming the prior formed composite ply 312-1, the composite ply 312 is placed or positioned on or over the prior formed composite ply 312-1 (e.g., and, thus, over the forming tool 308) such that at least a portion of the second ply surface 332 of the composite ply 312 is in contact with at least a portion of the first ply surface 330 of the prior formed composite ply 312-1. The forming feature 104 is positioned in contact with the first ply surface 330 of the composite ply 312. The forming feature 104 moves across the first ply surface 330 of the composite ply 312 to sweep a portion 350 of the composite ply 312 over the prior formed composite ply 312-1. As the forming feature 104 sweeps the portion 350 of the composite ply 312 over the prior formed composite ply 312-1, the forming feature 104 heats the portion 350 of the composite ply 312, compacts the portion 350 of the composite ply 312 against the prior formed composite ply 312-1, and forms the portion 350 of the composite ply 312 over the prior formed composite ply 312-1.

Referring to FIG. 4, in one or more examples, the forming feature 104 (e.g., the body 108) includes, or takes the form of, a bladder 118. The bladder 118 is inflatable. As such, the bladder 118 may also be referred to as an inflatable bladder. The bladder 118 is configured to passively follow contours of the forming surface 310 of the forming tool 308 by applying the compaction force 144 that is substantially constant. In one or more examples, the compaction force 144 may vary or is selectively controlled as needed. In an example, the compaction force 144 may be up to approximately 20 pounds per linear inch and may be up to at least approximately 200 pounds per linear inch.

The bladder 118 conforms to the contours (e.g., concave or convex profiles) of the forming surface 310 or the prior formed composite ply 312-1 along the forming tool 308. In one or more examples, a profile (e.g., a cross-sectional shape) of the bladder 118 and/or an angular orientation of the bladder 118 are manipulated using the end effector 102. For example, the end effector 102 controls a diameter, geometry, and/or surface profile of the bladder 118.

Referring still to FIG. 4, in one or more examples, the bladder 118 includes a tubular body 160 (e.g., a tubular wall) having an interior surface 148, an exterior surface 150, opposite the interior surface 148, and an at least partially hollow internal volume. In one or more examples, the heating element 112 is located within the bladder 118. As an example, the heating element 112 is coupled to the interior surface 148 of the bladder 118. As another example, the heating element 112 is located, or is integrated, within the tubular body 160, such as between the interior surface 148 and the exterior surface 150 of the bladder 118. For example, the bladder 118 is made of a laminate and the heating element 112 (e.g., the resistive heater 114 or the induction heater 116 shown in FIG. 1) is located between layers of the laminate.

Referring to FIG. 5, in one or more examples, the forming feature 104 (e.g., the body 108) includes, or takes the form of, a wiper 120. The wiper 120 includes a wiper body 162 and a wiper edge 164 that extends from the wiper body 162. The wiper 120 has any suitable geometry and/or stiffness depending on the application of the forming feature 104. In one or more examples, the heating element 112 is located on an interior of the wiper body 162, such as proximate (e.g., at or near) the wiper edge 164.

Referring to FIG. 6, in one or more examples, the forming feature 104 (e.g., the body 108) includes, or takes the form of, a finger 122. The finger 122 includes a finger body 166 and a finger end 168 that extends from the finger body 166. The finger 122 has any suitable geometry and/or stiffness depending on the application of the forming feature 104. In one or more examples, the heating element 112 is located on an interior of the finger body 166, such as proximate (e.g., at or near) the finger end 168.

In other examples, the forming feature 104 includes, or takes the form of, any one of various other forming members having various shapes, geometries, and/or configurations. For example, the body 108 of the forming feature 104 may be a bead of material, such as a bead of silicone, rubber, and the like.

Referring to FIG. 1, in one or more examples, the forming feature 104 is made of any material that is suitable for contact with the composite ply 312 in order to form the composite ply 312 over the forming surface 310 and compact the composite ply 312 against the forming surface 310. In one or more examples, the forming feature 104 is made of a material that is capable of withstanding generated by heat and transferring from the heating element 112 to the composite ply 312 via conduction when the forming feature 104 is in contact with the composite ply 312. In one or more examples, the forming feature 104 is made of a material that is flexible.

In one or more examples, the forming feature 104 is made of natural or synthetic rubber. In one or more examples, the forming feature 104 is made of a fluoroelastomer (e.g., fluorocarbon-based synthetic rubber). In one or more examples, the forming feature 104 is made of silicone. In one or more examples, the forming feature 104 is made of a high temperature flexible material that is capable of withstanding temperatures in the range of approximately 800° F. (426° C.), such as a metal braided tube or an aramid, a para-aramid, or other synthetic fiber (e.g., Kevlar®). Other materials for the forming feature 104 are also contemplated. In one or more examples, the forming feature 104 is made of a combination of various materials.

Referring to FIGS. 1-3, in one or more examples, the composite forming apparatus 100 cools the composite ply 312 via conduction after the composite ply 312 is compacted and formed over the forming tool 308 or over the prior formed composite ply 312-1.

In one or more examples, the composite forming apparatus 100 passively cools the composite ply 312 via conduction after the composite ply 312 is formed over the forming tool 308 or over the prior formed composite ply 312-1. For example, the heating element 112 is deactivated and the forming feature 104 is swept over the formed and compacted composite ply 312. In these examples, the forming feature 104 passively cools the composite ply 312 after the composite ply 312 is formed over the forming surface 310 of the forming tool 308 or over prior formed composite ply 312-1 via conduction. Heat is transferred from the composite ply 312 to forming feature 104 via conduction.

In one or more examples, the composite forming apparatus 100 actively cools the composite ply 312 via conduction after the composite ply 312 is compacted and formed over the forming tool 308 or over the prior formed composite ply 312-1. In one or more examples, the composite forming apparatus 100 includes a cooling element 124. The cooling element 124 is coupled to or is in thermal communication with the forming feature 104. The cooling element 124 cools (e.g., removes heat from) the forming features 104. For example, the heating element 112 is deactivated, the cooling element 124 is activated, and the forming feature 104 is swept over the formed and compacted composite ply 312. In these examples, the forming feature 104 actively cools the composite ply 312 after the composite ply 312 is formed over the forming surface 310 of the forming tool 308 or over the prior formed composite ply 312-1 via conduction. Heat is transferred from the composite ply 312 to forming feature 104 via conduction. Heat is then removed from the forming feature 104 using the cooling element 124.

In one or more examples, the cooling element 124 is in direct thermal communication with the forming feature 104 to cool the forming feature 104. In one or more examples, the cooling element 124 is located within the forming feature 104. For example, the cooling element 124 is located inside of the body 108 of the forming feature 104. In one or more examples, the cooling element 124 is situated in an interior of the body 108. Other configurations and constructions of the body 108 of the forming feature 104 and the cooling element 124 are also contemplated.

Referring to FIG. 1, in one or more examples, the cooling element 124 is, includes, or takes the form of the heat exchanger 152. The heat exchanger 152 utilizes a gas or liquid to remove heat from the forming feature 104.

Referring to FIGS. 4-6, in one or more examples, the cooling element 124 (e.g., the heat exchanger 152) includes, or takes the form of, the channel 126 that extends through the forming feature 104 (e.g., the body 108) and the fluid 128 that passes through the channel 126. Heat is transferred from composite ply 312 to the body 108 of the forming feature 104 and then from the body 108 of the forming feature 104 to the fluid 128 flowing through channel 126 formed through the body 108. The fluid 128 may be a gas (e.g., air) or a liquid (e.g., water). In one or more examples, the fluid 128 is chilled.

Referring to FIG. 1, in one or more examples, the composite forming apparatus 100 includes a temperature sensor 130. The temperature sensor 130 detects at least one of a temperature of the forming feature 104 and a temperature of the composite ply 312. In one or more examples, the temperature sensor 130 is a contact temperature sensor 132, such as a thermocouple, a thermistor, a resistance temperature detector (RTD), and the like. In one or more examples, the temperature sensor 130 is a non-contact temperature sensor 134, such as an infrared (IR) thermometer, a thermal imager, a radiation pyrometer, and the like.

Referring still to FIG. 1, in one or more examples, the composite forming apparatus 100 includes a control unit 136. The control unit 136 is coupled to (e.g., is in communication with) the heating element 112 and the temperature sensor 130. The control unit 136 selectively controls the heating element 112 based on a temperature signal 138 provided by the temperature sensor 130.

In one or more examples, control of the heating element 112 is open loop or closed loop. For example, the heating element 112 may be heated to a specified power output or be controlled with closed loop temperature feedback control. As an example, the control unit 136 may operate to control temperature using a control loop. As an example, the control loop may measure or otherwise utilize amperage supplied to the heating element 112 to determine a temperature of the forming feature 104 and/or a temperature of the composite ply 312.

In one or more examples, the temperature feedback control loop may utilize the amperage supplied to the heating element 112, the power output of the heating element 112, and/or the temperature detected by the temperature sensor 130. Such control may help prevent over or under heating to the target temperature of the composite ply 312, for example, between approximately 240° F. (115° C.) and approximately 330° F. (165° C.). Such a control loop may also include a feedback temperature reading of the forming feature 104 and/or the composite ply 312, for example, provided by a thermocouple, infrared (IR) camera, or other thermal measurement device (e.g., temperature sensor 130), a feedback power output reading from the heating element 112, a feedback amperage reading to the heating element 112, and the like. While 240° F. to 330° F. is a preferred temperature range for some example materials, a material specific heating temperature range may be as low as 100° F. (38° C.) and as high as 450° F. (232° C.).

Referring still to FIG. 1, in one or more examples, the composite forming apparatus 100 includes a sensor 140. In one or more examples, the sensor 140 is a pressure sensor, a load cell, a strain gauge, or the like that detects a force or a load applied to the forming feature 104. In one or more examples, the sensor 140 is a position sensor that detects a relative position of the forming feature 104.

In one or more examples, the control unit 136 is coupled to (e.g., is in communication with) the end effector 102 and the sensor 140. The control unit 136 selectively controls movement of the end effector 102 based on a sensor signal 142 provided by the sensor 140 to appropriately position the forming feature 104 such that the compaction force 144 is applied to the composite ply 312 using the forming feature 104 at a constant magnitude.

Referring to FIGS. 1-3, in one or more examples, the composite forming apparatus 100 includes a ply support member 106. The ply support member 106 is movable (e.g., linearly and/or rotationally) relative to the forming tool 308 and relative to the forming feature 104. In one or more examples, the ply support member 106 moves with the end effector 102 and/or the forming feature 104. In one or more examples, the ply support member 106 moves independent of the end effector 102 and/or the forming feature 104. The ply support member 106 supports a portion of the composite ply 312 that extends beyond an edge 316 of the forming tool 308 before and/or while the composite ply 312 is formed over the forming surface 310 of the forming tool 308 or over the prior formed composite ply 312-1 using the forming feature 104.

Referring to FIGS. 2 and 3, in one or more examples, the ply support member 106 includes a ply support plate 154. The ply support plate 154 includes a ply support surface 156 that supports the portion 350 of the composite ply 312, which extends beyond the edge 316 of the forming tool 308.

In one or more examples, the ply support plate 154 is selectively movable relative to the forming tool 308 and/or the end effector 102. In one or more examples, the composite forming apparatus 100 or the ply support member 106 includes a support-member-movement mechanism 170. The support-member-movement mechanism 170 selectively moves and positions the ply support plate 154. In one or more examples, the ply support member 106 is coupled to the end effector 102, such as by the support-member-movement mechanism 170.

In one or more examples, the ply support plate 154 is linearly movable along one or more axes (e.g., translates along a horizontal axis and/or a vertical axis). As an example, the ply support plate 154 linearly moves (e.g., horizontally) toward and away from the forming tool 308 (e.g., as illustrated by directional arrow 356 in FIG. 2) while the composite ply 312 is being laid down (e.g., formed and compacted). As another example, the ply support plate 154 linearly moves (horizontally) along a length of the forming tool 308 while the composite ply 312 is being laid down. As another example, the ply support plate 154 linearly moves (e.g., vertically) along a height of the forming tool 308 (e.g., as illustrated by directional arrow 358 in FIG. 2) while the composite ply 312 is being laid down.

In one or more example, the ply support plate 154 is rotationally movable along one or more axes (e.g., rotates about a horizontal axis and/or a vertical axis). As an example, the ply support plate 154 rotationally moves (e.g., about a horizontal axis) relative to the forming tool 308 (e.g., as illustrated by directional arrow 360 in FIG. 2) while the composite ply 312 is being laid down.

In one or more examples, the ply support member 106 heats the portion of the composite ply 312, which that extends beyond the edge 316 of the forming tool 308, via conduction. In one or more examples, the ply support member 106 includes a heating element 158. The heating element 158 is coupled to the ply support plate 154 and/or is in thermal communication with the ply support plate 154 to heat the ply support surface 156. Heat is transferred from the ply support plate 154 to the portion 350 of the composite ply 312 via conduction. In one or more examples, the heating element 158 is a resistive heater. In one or more examples, the heating element 158 is an induction heater.

Referring to FIGS. 2 and 3, in one or more examples, one or more additional heaters 370 may be used to heat a portion (e.g., portion 350) of the composite ply 312 that is supported by the ply support member 106. For example, the additional heater 370 may be positioned over the portion 350 of the composite ply 312 such that the composite ply 312 is positioned between the additional heater 370 and the ply support plate 154. In these examples, the ply support plate 154 transfers heat to the second ply surface 332 of the composite ply 312 via conduction and the additional heater 370 transfers heat to the first ply surface 330 via conduction. Examples of the additional heater 370 include, but are not limited to, a heat blanket, a heat plate, and the like.

Referring to FIGS. 2 and 3, additionally, in one or more examples, an entirety of the composite ply 312 is heated (e.g., pre-heated) before the composite ply 312 is formed over the forming surface 310 of the forming tool 308 or over prior formed composite ply 312-1. For example, a manufacturing environment 318, surrounding the composite ply 312, may be heated to increase the temperature of the composite ply 312 before and/or while the composite ply 312 is formed using the forming feature 104. In one or more examples, the system 300 includes an environment heater 320 that heats the manufacturing environment 318 and, thus, the composite ply 312. Generally, pre-heating the composite ply 312 using the environment heater 320 is performed when the composite ply 312 is made of high temperature thermoplastic materials. In such examples, the manufacturing environment 318 may be heated to approximately 400° F. (204° C.) using the environment heater 320. In such examples, the forming feature 104 may be heated up to approximately 800° F. (426° C.) using the heating element 112.

Referring still to FIGS. 2 and 3, in one or more examples, at least a portion of the composite ply 312 is heated by the forming tool 308 via conduction. In one or more examples, the forming tool 308 includes at least one tool-heater 372. The tool-heater 372 is coupled to the forming tool 308, such as within the forming tool 308, and/or is in thermal communication with the forming surface 310 of the forming tool 308 to heat the forming surface 310. Heat is transferred from the forming tool 308 to a portion of the composite ply 312 via conduction. In one or more examples, the tool-heater 372 is a resistive heater. In one or more examples, the tool-heater 372 is an induction heater. Other examples of the tool-heater 372 include, but are not limited to, an IR heater, a laser heater, a Xenon flash heater, and the like. In one or more examples, the tool-heater 372 selectively heats a portion of the composite ply 312 opposite the forming feature 104.

Referring still to FIG. 1-3, in one or more examples, the composite forming apparatus 100 includes a stomp foot 324. The stomp foot 324 is movable relative to the end effector 102. The stomp foot 324 presses the composite ply 312 against the forming surface 310 of the forming tool 308 or against the prior formed composite ply 312-1 before and/or while the composite ply 312 is formed over the forming surface 310 of the forming tool 308 or over the prior formed composite ply 312-1 using the forming feature 104.

In one or more examples, the stomp foot 324 moves linearly along an axis (e.g., a vertical axis) to press and hold the composite ply 312 against the forming tool 308 or against the prior formed composite ply 312-1. In one or more examples, the stomp foot 324 includes one of a flat profile or a curved profile, depending on the geometry of the forming tool 308.

In one or more examples, the composite forming apparatus 100 includes more than one stomp foot 324 that engage the composite ply 312 at a plurality of discrete locations on the forming tool 308. In one or more examples, the stomp foot 324 is continuous and/or elongate member that engages a continuous portion of the composite ply 312 on the forming tool 308 (e.g., over a web of the forming tool 308).

Referring to FIG. 1, in one or more examples, the composite forming system 300 includes a movement mechanism 302. The composite forming apparatus 100 is coupled to the movement mechanism 302. The movement mechanism 302 includes any suitable programmable machine that selectively moves and positions the composite forming apparatus 100 in three-dimensional space. In one or more examples, the movement mechanism 302 includes, or takes the form of, a robotic arm, an overhead gantry, and the like. The movement mechanism 302 selectively positions and moves the composite forming apparatus 100 relative to the forming surface 310 of the forming tool 308 to form and compact the composite ply 312 over the forming surface 310 or over the prior formed composite ply 312-1 using the forming feature 104. The composite forming apparatus 100 actively heats the composite ply 312 via conduction before and/or while the composite ply 312 is formed over the forming surface 310 of the forming tool 308 or over the prior formed composite ply 312-1 using the forming feature 104.

Referring to FIGS. 1-3 and 7-9, in one or more examples, the composite forming system 300 includes the movement mechanism 302, the end effector 102, the forming feature 104, and the heating element 112. The end effector 102 is coupled to the movement mechanism 302. The forming feature 104 is coupled to the end effector 102. The heating element 112 is coupled to the forming feature 104. The end effector 102 selectively positions and moves the forming feature 104 relative to the forming surface 310 of the forming tool 308 to apply the compaction force 144 to the composite ply 312. The movement mechanism 302 selectively positions and moves the end effector 102 relative to the forming surface 310 of the forming tool 308 to form a portion (e.g., portion 350) of the composite ply 312 over a portion of the forming surface 310 or over at least a portion of the prior formed composite ply 312-1 using the forming feature 104. The heating element 112 heats the forming feature 104. Heat is transferred from the forming feature 104 to the composite ply 312 via conduction.

Figure 7:
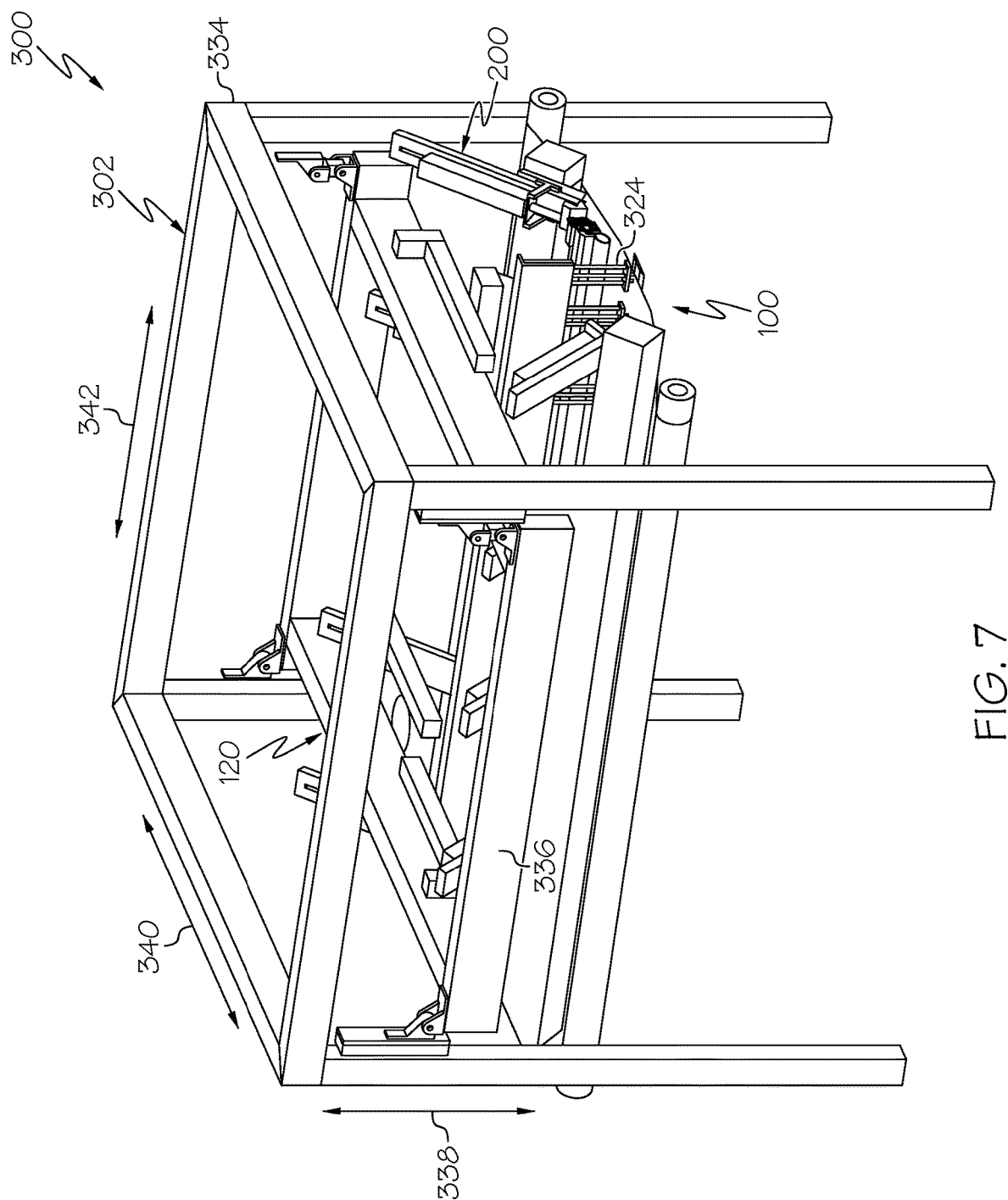
FIG. 7 is a schematic, perspective view of an example of a composite forming system.
Figure 8:
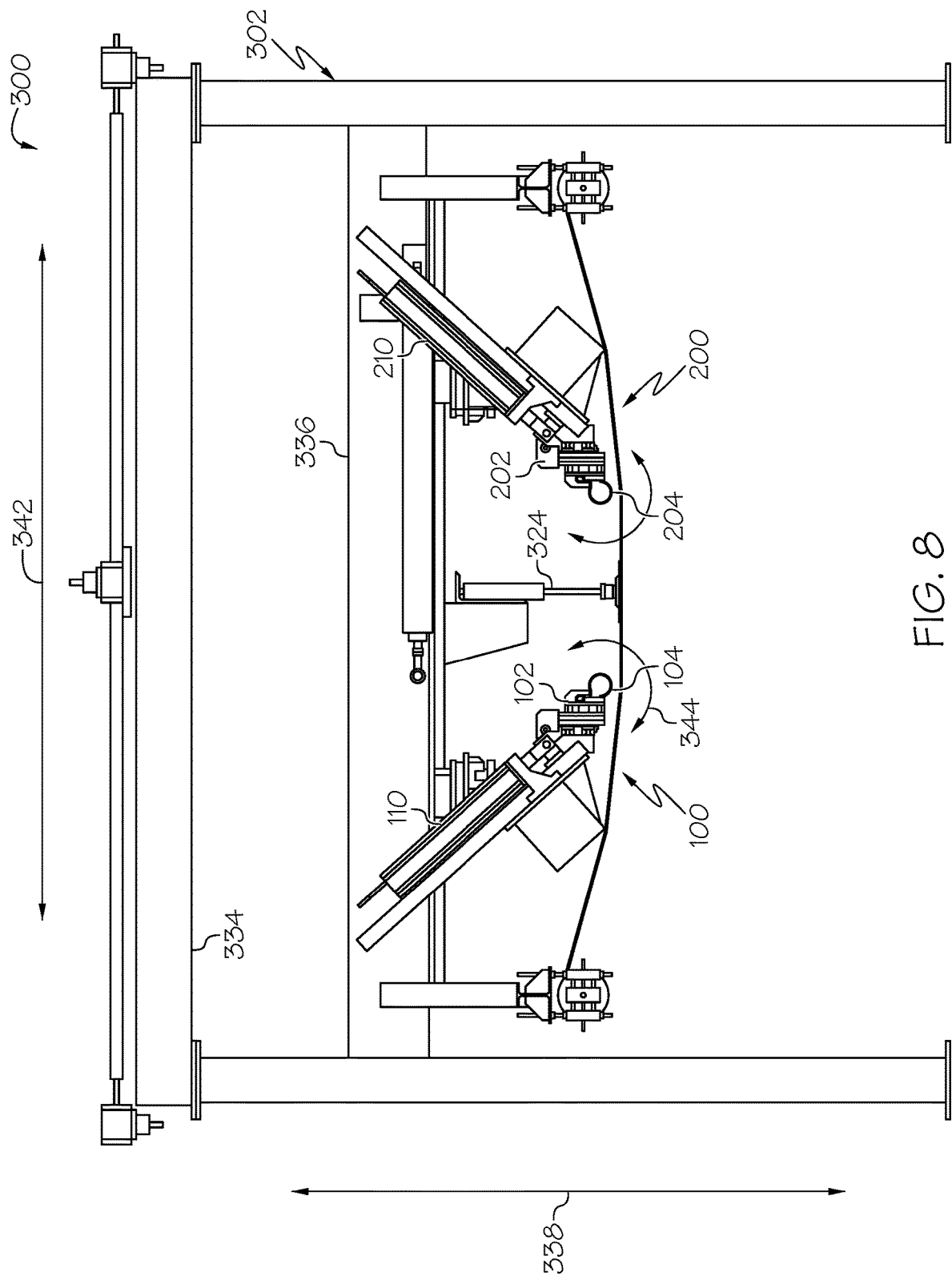
FIG. 8 is a schematic, elevational view of an example of the composite forming system.
Figure 9:
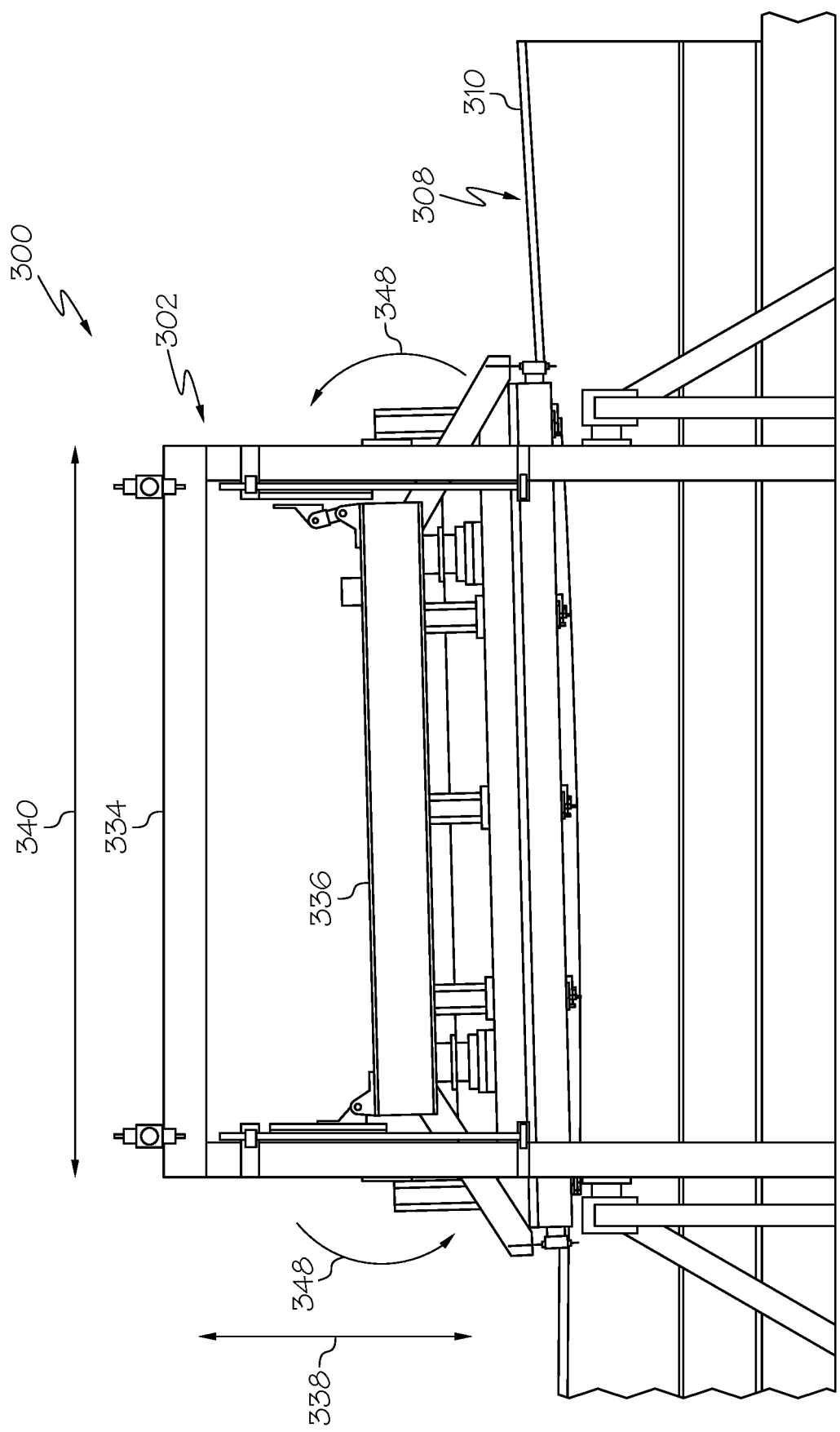
FIG. 9 is a schematic, elevational view of an example of the composite forming system and a forming tool.

Referring to FIGS. 7-9, in one or more examples, the movement mechanism 302 moves and selectively positions the end effector 102 along a plurality of movement axes, including a first axis 338, a second axis 340 that is perpendicular to the first axis 338, and a third axis 342 that is perpendicular to the first axis 338 and the second axis 340. In the illustrative examples, the first axis 338 (e.g., a vertical axis) is approximately vertical and the second axis 340 (e.g., a first horizontal axis) and the third axis 342 (e.g., a second horizontal axis) are approximately horizontal. For the purpose of the present disclosure, movement along a referenced axis refers to linear movement in a direction that is parallel to the referenced axis. For the purpose of the present disclosure, rotational movement about a referenced axis refers to rotation about an axis that is parallel to or coincident with the referenced axis.

In one or more example, the movement mechanism 302 includes a frame 334. In one or more examples, the frame 334 is generally rectangular in shape. In one or more examples, the frame 334 is an overhead frame and the forming tool 308 is positioned under the frame 334 during the layup operation. Generally, the frame 334 defines the first axis 338, the second axis 340, and the third axis 342. In one or more examples, the movement mechanism 302 includes a carriage 336. The carriage 336 is coupled to the frame 334. The frame 334 surrounds the carriage 336. In one or more examples, the carriage 336 has a shape that is generally the same as the frame 334 but is smaller such that the carriage 336 nests within the frame 334.

In one or more examples, the carriage 336 is movable relative to the frame 334. In one or more examples, the carriage 336 is pivotably movable and/or rotationally movable about the first axis 338, the second axis 340, and/or the third axis 342 (e.g., as shown by directional arrows 348 in FIG. 9). In one or more examples, the carriage 336 is linearly movable along the first axis 338, the second axis 340, and/or the third axis 342. In one or more examples, the end effector 102 is coupled to the carriage 336. Movement of the carriage 336 moves and selectively positions the end effector 102 relative to the forming tool 308 to accommodate the geometry or configuration of the forming tool 308 and achieve a best fit position for the end effector 102.

Referring to FIGS. 7 and 8, in one or more examples, the end effector 102 is movable relative to the movement mechanism 302, such as relative to the carriage 336. In one or more examples, the end effector 102 is linearly movable relative to the movement mechanism 302 such as along at least one of the first axis 338, the second axis 340 and/or the third axis 342 (e.g., in the directions of directional arrow 362 and/or directional arrow 364 shown in FIG. 2) or off-axis (e.g., in the directions of directional arrow 366 shown in FIG. 2). In one or more examples, the end effector 102 is rotationally movable relative to the movement mechanism 302, such as about at least one of the first axis 338, the second axis 340 and/or the third axis 342 (e.g., in the directions of directional arrow 344 shown in FIGS. 2 and 8).

Referring to FIG. 8, in one or more examples, the composite forming apparatus 100 includes an actuator 110. The actuator 110 is coupled to, or forms a portion of, the end effector 102. In one or more examples, the actuator 110 is, or includes, a linear actuator and the actuator 110 linearly moves the end effector 102 or the forming feature 104 relative to the carriage 336 (e.g., in the directions of directional arrow 362, directional arrow 364 and/or directional arrow 366 shown in FIG. 2) to position the forming feature 104 into contact with the composite ply 312. In one or more examples, the actuator 110 is, or includes, a rotary actuator and the actuator 110 rotationally moves the end effector 102 or the forming feature 104 relative to the carriage 336 (e.g., in the directions of directional arrow 344 shown in FIGS. 2 and 8) to angularly orient the forming feature 104 relative to the forming tool 308 and position the forming feature 104 into contact with the composite ply 312. In one or more examples, the actuator 110 is selectively controlled, for example, by the control unit 136, to control the position of the forming feature 104 and, thus, the compaction force 144 applied to the composite ply 312 by the forming feature 104.

In one or more examples, the actuator 110 is any one of various suitable types of controllable actuators. In an example, the actuator 110 is a pneumatic actuator. In an example, the actuator 110 is a hydraulic actuator. In an example, the actuator 110 is a mechanical actuator.

In one or more examples, the sensor 140 is coupled to, or is in communication with, the actuator 110. In one or more examples, the sensor 140 detects at least one of a stroke position of the actuator 110 and a force acting on the actuator 110, which is used to determine the position of the forming feature 104 and to control the compaction force 144 for precise forming on the forming tool 308 having a complex geometry or surface contour.

In one or more examples, the control unit 136 is, or includes, a numerical control (NC) unit. In these examples, the control unit 136 operates in accordance with a numerical control program and in conjunction with data (e.g., collected, received, and analyzed) from the sensor 140 to determine proper movement and position of the end effector 102 relative to the forming tool 308.

Referring to FIGS. 1-3, in one or more examples, the composite forming system 300 includes the ply support member 106 that is movable relative to the forming tool 308 and relative to the composite forming composite forming apparatus 100 to support the portion of the composite ply 312, which extends beyond an edge 316 of the forming tool 308.

In one or more examples, the ply support member 106 is coupled to the end effector 102. In these examples, the ply support member 106 is movable with the end effector 102, such as by the carriage 336, relative to the forming tool 308. In these examples, the ply support member 106 may also be movable relative to the end effector 102, such as via the support-member-movement mechanism 170.

In one or more examples, the ply support member 106 is coupled to the movement mechanism 302, such as to the carriage 336. In these examples, the ply support member 106 is movable relative to the carriage 336, relative to the end effector 102, and relative to the forming tool 308. In one or more examples, the support-member-movement mechanism 170 is dedicated to the ply support member 106 such that the ply support member 106 moves and is selectively positioned relative to the forming tool 308 independent of the carriage 336 and/or the end effector 102.

Referring to FIGS. 1 and 7-10, in one or more examples, the composite forming system 300 includes a second composite forming apparatus 200. The second composite forming apparatus 200 is coupled to the movement mechanism 302. The second composite forming apparatus 200 is spaced away from the composite forming composite forming apparatus 100. The movement mechanism 302 selectively positions and moves the second composite forming apparatus 200 to form and compact the composite ply 312 over the forming surface 310 or over the prior formed composite ply 312-1. The second composite forming apparatus 200 actively heats the composite ply 312 via conduction before and/or while the composite ply 312 is formed over the forming surface 310 or over the prior formed composite ply 312-1.

Examples of the second composite forming apparatus 200 are substantially the same as the examples of the composite forming apparatus 100 described herein above and illustrated in FIGS. 1-6. In one or more examples, the second composite forming apparatus 200 includes a second end effector 202, a second forming feature 204, and a second heating element 212.

Examples of the second end effector 202, the second forming feature 204, and the second heating element 212 are substantially the same as the examples of the end effector 102, the forming feature 104, and the heating element 112 described herein above and illustrated in FIGS. 1-6. The second forming feature 204 is coupled to the second end effector 202. The second heating element 212 is coupled to the second forming feature 204. The second heating element 212 heats the second forming feature 204. The second end effector 202 moves the second forming feature 204 relative to the forming tool 308 to form the composite ply 312 over the forming surface 310 of the forming tool 308 or over the prior formed composite ply 312-1. The second forming feature 204 actively heats the composite ply 312 via conduction. The second forming feature 204 heats the composite ply 312 before and/or while the composite ply 312 is formed over the forming surface 310 of the forming tool 308 or over the prior formed composite ply 312-1.

Referring still to FIGS. 1 and 7-10, in one or more examples, the composite forming system 300 includes the second end effector 202, the second forming feature 204, and the second heating element 212. The second end effector 202 is coupled to the movement mechanism 302, such as to the carriage 336. The second forming feature 204 is coupled to the second end effector 202. The second heating element 212 is coupled to the second forming feature 204. The second end effector 202 selectively moves the second forming feature 204 relative to the forming surface 310 of the forming tool 308 to apply a second compaction force 244 to the composite ply 312. The movement mechanism 302 selectively moves the second end effector 202 relative to the forming surface 310 of the forming tool 308 to form a second portion of the composite ply 312 over a second portion of the forming surface 310 or over at least a second portion of the prior formed composite ply 312-1 using the second forming feature 204. The second heating element 212 heats the second forming feature 204. Heat is transferred from the second forming feature 204 to the composite ply 312 via conduction.

Figure 10:
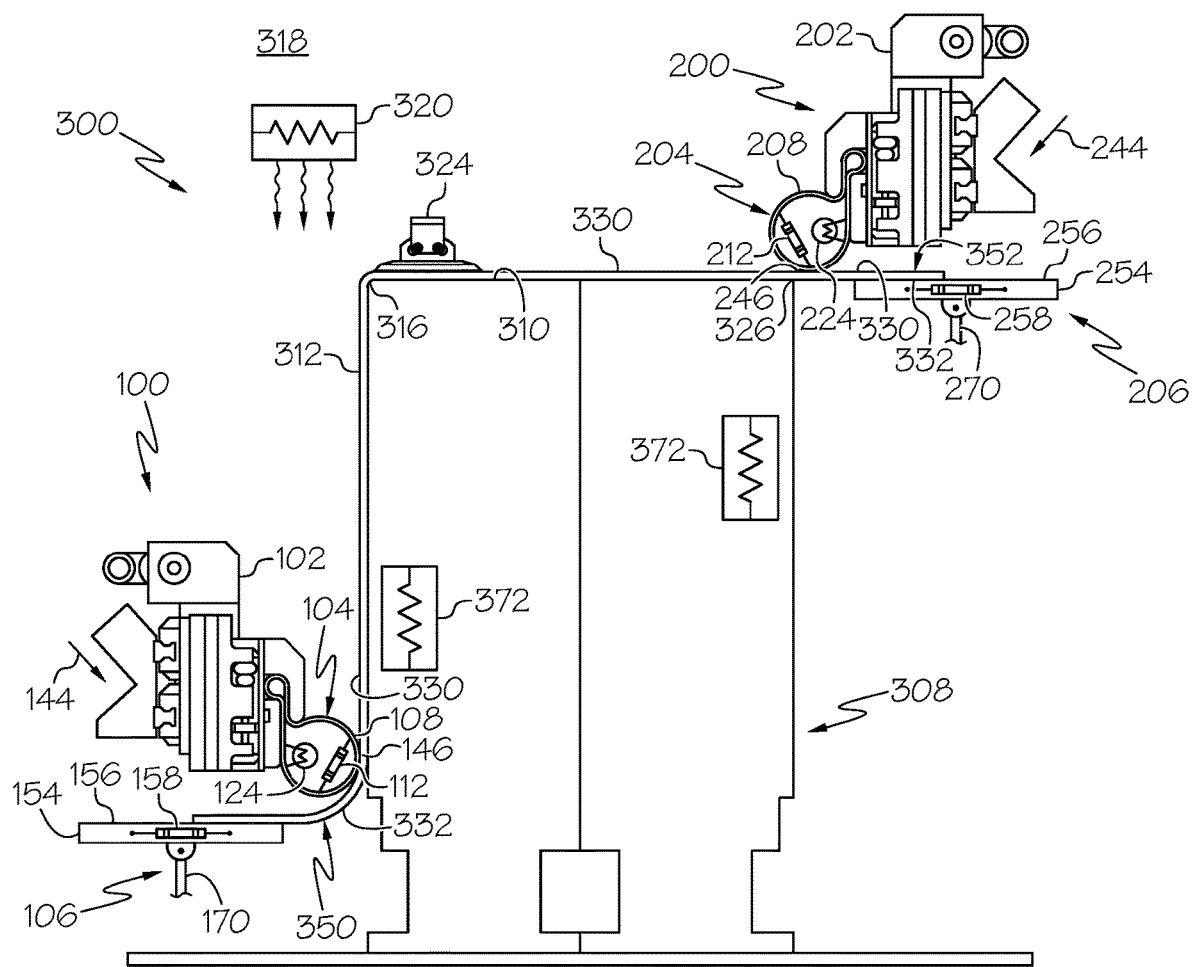
FIG. 10 is a schematic, elevational view of an example of a portion of the composite forming system.

Referring to FIGS. 1 and 10, in one or more examples, the composite forming system 300 includes a second ply support member 206. Examples of the second ply support member 206 are substantially the same as the examples of the ply support member 106 described herein above and illustrated in FIGS. 1-3.

In one or more examples, the second ply support member 206 includes a second ply support plate 254. The second ply support plate 254 includes a second ply support surface 256 that supports a second portion 352 of the composite ply 312, which extends beyond a second edge 326 of the forming tool 308.

In one or more examples, the second ply support member 206 is movable relative to the forming tool 308. In one or more examples, the second ply support member 206 is movable relative to the second end effector 202 and/or the second forming feature 204.

In one or more examples, the second ply support plate 254 is selectively movable relative to the forming tool 308 and/or the second end effector 202. In one or more examples, the composite forming apparatus 100 or the second ply support member 206 includes a second support-member-movement mechanism 270. The second support-member-movement mechanism 270 selectively moves and positions the second ply support plate 254. In one or more examples, the second ply support member 206 is coupled to the second end effector 202, such as by the second support-member-movement mechanism 270.

In one or more examples, the second ply support member 206 heats the second portion of the composite ply 312, which that extends beyond the second edge 326 of the forming tool 308, via conduction. In one or more examples, the second ply support member 206 includes a second heating element 258. The second heating element 258 is coupled to the second ply support plate 254 and/or is in thermal communication with the second ply support plate 254 to heat the second ply support surface 256. Heat is transferred from the second ply support plate 254 to the second portion 352 of the composite ply 312 via conduction. In one or more examples, the second heating element 258 is a resistive heater. In one or more examples, the second heating element 258 is an induction heater.

Referring to FIGS. 1, 8, and 10, in one or more examples, the composite forming system 300 includes the stomp foot 324. In one or more examples, the stomp foot 324 is coupled to the movement mechanism 302, such as to the carriage 336. The stomp foot 324 is movable relative to the movement mechanism 302 to press the composite ply 312 against the forming surface 310 of the forming tool 308 or against prior formed composite ply 312-1 before and/or while the composite ply 312 is formed over the forming surface 310 of the forming tool 308 or over the prior formed composite ply 312-1 using the forming feature 104 and/or the second forming feature 204.

Referring to FIGS. 8 and 10, in one or more examples, the stomp foot 324 is located between the composite forming apparatus 100 (e.g., the end effector 102) and the second composite forming apparatus 200 (e.g., the second end effector 202).

Referring to FIG. 1, in one or more examples, the second heating element 212 is in direct thermal communication with the second forming feature 204 to heat the second forming feature 204. In one or more examples, the second heating element 212 is located within the second forming feature 204. In one or more examples, the second forming feature 204 includes a second body 208 and a second interface surface 246 (e.g., as shown in FIG. 10). In one or more examples, the second heating element 212 is located inside of the second body 208. In one or more examples, the second heating element 212 is situated in or is coupled to an interior of the second body 208. For example, the second body 208 may be formed of a laminate of material layers and the second heating element 212 is located between material layers of the laminate. Other configurations and constructions of the second body 208 of the second forming feature 204 and the second heating element 212 are also contemplated.

Referring still to FIG. 1, in one or more examples, the second heating element 212 is the resistive heater 114. In one or more examples, the second heating element 212 is the induction heater 116. In one or more examples, the second heating element 212 is the heat exchanger 152. In other examples, the second heating element 212 is any one of various other types of suitable heaters.

Referring to FIGS. 1 and 10, in one or more examples, the second forming feature 204 (e.g., the second body 208) includes or takes the form of any forming member that is suitable for or that is capable of forming the composite ply 312 over the forming surface 310 or the prior formed composite ply 312-1 and compacting the composite ply 312 against the forming surface 310 or against the prior formed composite ply 312-1.

Referring to FIG. 1, in one or more examples, the second forming feature 204 (e.g., the second body 208) includes, or takes the form of, the bladder 118 (e.g., as shown in FIG. 4). The bladder 118 is inflatable. In one or more examples, the second heating element 212 is coupled to the interior surface 148 of the bladder 118 of the second forming feature 204. In one or more examples, the second heating element 212 is located between the interior surface 148 and the exterior surface 150 of the bladder 118 of the second forming feature 204.

Referring still to FIG. 1, in one or more examples, the second forming feature 204 (e.g., the second body 208) includes, or takes the form of, the wiper 120 (e.g., as shown in FIG. 5). In one or more examples, the second forming feature 204 (e.g., the second body 208) includes, or takes the form of, the finger 122 (e.g., as shown in FIG. 6). In other examples, the second forming feature 204 includes, or takes the form of, any one of various other forming members having various shapes, geometries, and/or configurations. For example, the second body 208 of the second forming feature 204 may be a bead of material, such as a bead of silicone, rubber, and the like.

Referring to FIG. 1, in one or more examples, the second forming feature 204 is made of any material that is suitable for contact with the composite ply 312 in order to form the composite ply 312 over the forming surface 310 or over the prior formed composite ply 312-1 and compact the composite ply 312 against the forming surface 310 or against the prior formed composite ply 312-1. In one or more examples, the second forming feature 204 is made of a material that is capable of withstanding heat and transferring heat from the second heating element 212 to the composite ply 312 via conduction when the second forming feature 204 is in contact with the composite ply 312.

In one or more examples, the second forming feature 204 is made of a material that is flexible. In one or more examples, the second forming feature 204 is made of a fluoroelastomer. In one or more examples, the second forming feature 204 is made of silicone. In one or more examples, the second forming feature 204 is made of a high temperature flexible material, such as a metal braided tube or an aramid, a para-aramid, or other synthetic fiber (e.g., Kevlar®). Other materials for the second forming feature 204 are also contemplated. In one or more examples, the second forming feature 204 is made of a combination of various materials.

Referring to FIGS. 7 and 8, in one or more examples, the second end effector 202 is movable relative to the movement mechanism 302, such as relative to the carriage 336. In one or more examples, the second end effector 202 is linearly movable relative to the movement mechanism 302. In one or more examples, the second end effector 202 is rotationally movable relative to the movement mechanism 302.

In one or more examples, the second composite forming apparatus 200 includes a second actuator 210. The second actuator 210 is coupled to, or forms a portion of, the second end effector 202. In one or more examples, the second actuator 210 is, or includes, a linear actuator and the second actuator 210 linearly moves the second end effector 202 or the second forming feature 204 relative to the carriage 336 to position the second forming feature 204 into contact with the composite ply 312. In one or more examples, the second actuator 210 is, or includes, a rotary actuator and the second actuator 210 rotationally moves the second end effector 202 or the second forming feature 204 relative to the carriage 336 to angularly orient the second forming feature 204 relative to the forming tool 308 and position the second forming feature 204 into contact with the composite ply 312. In one or more examples, the second actuator 210 is selectively controlled, for example, by the control unit 136, to control the position of the second forming feature 204 and, thus, the second compaction force 244 applied to the composite ply 312 by the second forming feature 204.

Referring to FIGS. 1 and 10, in one or more examples, the second composite forming apparatus 200 actively cools the composite ply 312 via conduction. In one or more examples, the second composite forming apparatus 200 includes a second cooling element 224. The second cooling element 224 is coupled to the second forming feature 204. The second cooling element 224 cools (e.g., removes heat from) the second forming features 204. The second forming feature 204 actively cools the composite ply 312 after the composite ply 312 is formed over the forming surface 310 of the forming tool 308 or over the prior formed composite ply 312-1. Heat is transferred from the composite ply 312 to second forming feature 204 via conduction.

Examples of the second cooling element 224 are substantially the same as the examples of the cooling element 124 described herein above and illustrated in FIGS. 1-6. In one or more examples, the second cooling element 224 is in direct thermal communication with the second forming feature 204 to cool the second forming feature 204. In one or more examples, the second cooling element 224 is located within the second forming feature 204. For example, the second cooling element 224 is located inside of the body 108 of the second forming feature 204. In one or more examples, the second cooling element 224 is situated in an interior of the body 108. Other configurations and constructions of the body 108 of the second forming feature 204 and the second cooling element 224 are also contemplated.

Referring to FIG. 10, in one or more examples, the second cooling element 224 includes, or takes the form of, a second channel, which is substantially the same as the channel 126 (e.g., as shown in FIGS. 4-6). The second channel extends through the second forming feature 204 (e.g., the second body 208). A second fluid, which is substantially the same of the fluid 128 (e.g., as shown in FIGS. 4 and 5), passes through the second channel. Heat is transferred from the second body 208 of the second forming feature 204 to the second fluid flowing through second channel formed through the second body 208. The second fluid may be a gas (e.g., air) or a liquid (e.g., water). In one or more examples, the second fluid is chilled.

Referring to FIG. 1, in one or more examples, the second composite forming apparatus 200 includes a second temperature sensor 230. The second temperature sensor 230 detects at least one of a temperature of the second forming feature 204 and a temperature of the composite ply 312. In one or more examples, the second temperature sensor 230 is the contact temperature sensor 132. In one or more examples, the second temperature sensor 230 is the non-contact temperature sensor 134.

Referring to FIG. 1, in one or more examples, the composite forming system 300 includes the control unit 136. The control unit 136 is coupled to (e.g., is in communication with) the heating element 112, the temperature sensor 130, the second heating element 212 and the second temperature sensor 230. The control unit 136 selectively controls the heating element 112 based on the temperature signal 138 provided by the temperature sensor 130. The control unit 136 selectively controls the second heating element 212 based on a second temperature signal 238 provided by the second temperature sensor 230.

Referring still to FIG. 1, in one or more examples, the second composite forming apparatus 200 includes a second sensor 240. In one or more examples, the second sensor 240 is a pressure sensor, a load cell, a strain gauge, or the like that detects a force or a load applied to the second forming feature 204. In one or more examples, the second sensor 240 is a position sensor that detects a relative position of the second forming feature 204.

In one or more examples, the control unit 136 is coupled to (e.g., is in communication with) the second end effector 202 and the second sensor 240. The control unit 136 selectively controls movement of the second end effector 202 based on a second sensor signal 242 provided by the second sensor 240 to appropriately position the second forming feature 204 such that the second compaction force 244 is applied to the composite ply 312 using the second forming feature 204 at a constant magnitude.

Figure 11:
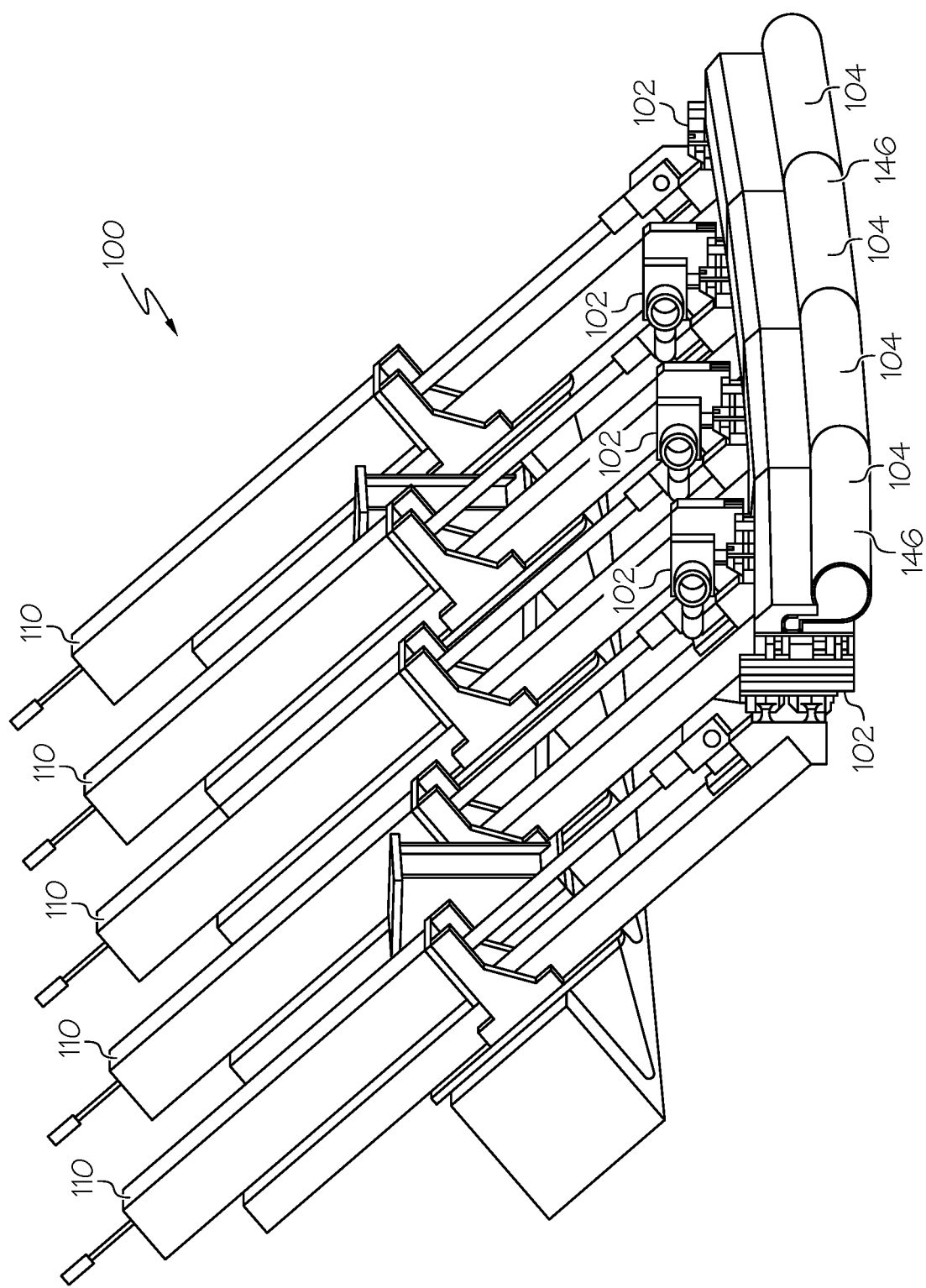
FIG. 11 is a schematic, perspective view of an example of a plurality of composite forming apparatuses of the composite forming system.
Figure 12:
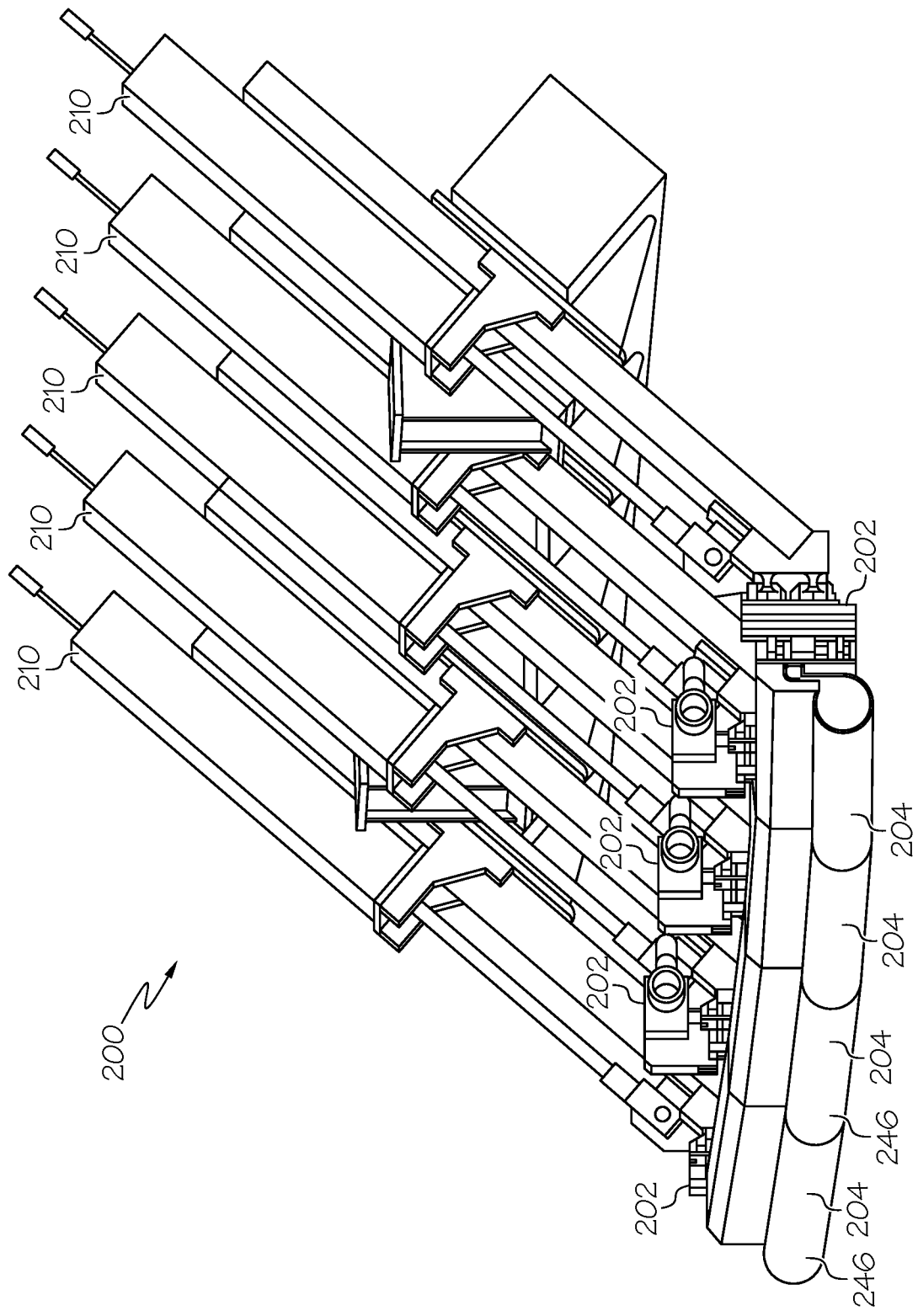
FIG. 12 is a schematic, perspective view of an example of a plurality of second composite forming apparatuses of the composite forming system.

Referring to FIGS. 1, 11, and 12, in one or more examples, the composite forming system 300 includes a plurality of composite forming apparatuses 100 (e.g., as illustrated in FIG. 11). In one or more examples, the composite forming system 300 includes a plurality of second composite forming apparatuses 200 (e.g., as shown in FIG. 12). Each one of the plurality of composite forming apparatuses 100 is coupled to the movement mechanism 302. Each one of the plurality of second composite forming apparatuses 200 is coupled to the movement mechanism 302.

Referring to FIG. 11, in one or more examples, the composite forming system 300 includes a plurality of end effectors 102, a plurality of forming features 104, and a plurality of heating elements 112. Each one of the plurality of end effectors 102 is coupled to the movement mechanism 302, such as to the carriage 336. Each one of the plurality of forming features 104 is coupled to a corresponding one of the plurality of end effectors 102. Each one of the plurality of heating elements 112 is coupled to a corresponding one of the plurality of forming features 104. Each one of the plurality of end effectors 102 selectively positions and moves a corresponding one of the plurality of forming features 104 relative to the forming surface 310 of the forming tool 308 to apply the compaction force 144 to the composite ply 312. The movement mechanism 302 selectively positions and moves each one of the plurality of end effectors 102 relative to the forming surface 310 of the forming tool 308 to form a portion of the composite ply 312 over a portion of the forming surface 310 or at least a portion of the prior formed composite ply 312-1 using a corresponding one of the plurality of forming features 104. Each one of the plurality of heating elements 112 heats a corresponding one of the plurality of forming features 104. Heat is transferred from each one of the plurality of forming features 104 to the composite ply 312 via conduction.

In one or more examples, the composite forming system 300 includes a plurality of temperature sensors 130. Each one of the plurality of temperature sensors 130 detects at least one of a temperature of a corresponding one of the plurality of forming features 104 and a temperature of the composite ply 312. The control unit 136 is coupled to (e.g., is in communication with) each one of the plurality of heating elements 112 and each one of the plurality of temperature sensors 130. The control unit 136 selectively controls each one of the plurality of heating elements 112 based on the temperature signal 138 provided by a corresponding one of the plurality of temperature sensors 130.

In one or more examples, the composite forming system 300 includes a plurality of sensors 140. Each one of the plurality of sensors 140 detects at least one of a force applied to and a relative position of a corresponding one of the plurality of forming features 104. In one or more examples, the control unit 136 is coupled to (e.g., is in communication with) each one of the plurality of end effectors 102 and each one of the plurality of sensors 140. The control unit 136 selectively controls movement of each one of the plurality of end effectors 102 based on the sensor signal 142 provided by a corresponding one of the plurality of sensors 140 to apply the compaction force 144 at a constant magnitude to the composite ply 312 using a corresponding one of the plurality of forming features 104.

In one or more examples, the plurality of forming features 104 form the interface surface 146 that is substantially continuous for contact with the composite ply 312. For example, each one of the plurality of forming features 104 abuts a directly adjacent one of the plurality of forming features 104 to form the interface surface 146 for contact with the composite ply 312.

Referring to FIG. 12, in one or more examples, the composite forming system 300 includes a plurality of second end effectors 202, a plurality of second forming features 204, and a plurality of second heating elements 212. Each one of the plurality of second end effectors 202 is coupled to the movement mechanism 302, such as to the carriage 336. Each one of the plurality of second forming features 204 is coupled to a corresponding one of the plurality of second end effectors 202. Each one of the plurality of second heating elements 212 is coupled to a corresponding one of the plurality of second forming features 204. Each one of the plurality of second end effectors 202 selectively positions and moves a corresponding one of the plurality of second forming features 204 relative to the forming surface 310 of the forming tool 308 to apply the second compaction force 244 to the composite ply 312. The movement mechanism 302 selectively positions and moves each one of the plurality of second end effectors 202 relative to the forming surface 310 of the forming tool 308 to form a second portion of the composite ply 312 over a second portion of the forming surface 310 or over at least a second portion of the prior formed composite ply 312-1 using a corresponding one of the plurality of second forming features 204. Each one of the plurality of second heating elements 212 heats a corresponding one of the plurality of second forming features 204. Heat is transferred from each one of the plurality of second forming features 204 to the composite ply 312 via conduction.

In one or more examples, the composite forming system 300 includes a plurality of second temperature sensors 230. Each one of the plurality of second temperature sensors 230 detects at least one of a temperature of a corresponding one of the plurality of second forming features 204 and a temperature of the composite ply 312. The control unit 136 is coupled to (e.g., is in communication with) each one of the plurality of second heating elements 212 and each one of the plurality of second temperature sensors 230. The control unit 136 selectively controls each one of the plurality of second heating elements 212 based on the second temperature signal 238 provided by a corresponding one of the plurality of second temperature sensors 230.

In one or more examples, the composite forming system 300 includes a plurality of second sensors 240. Each one of the plurality of second sensors 240 detects at least one of a force applied to and a relative position of a corresponding one of the plurality of second forming features 204. In one or more examples, the control unit 136 is coupled to (e.g., is in communication with) each one of the plurality of second end effectors 202 and each one of the plurality of second sensors 240. The control unit 136 selectively controls movement of each one of the plurality of second end effectors 202 based on a second sensor signal 242 provided by a corresponding one of the plurality of second sensors 240 to apply the second compaction force 244 at a constant magnitude to the composite ply 312 using a corresponding one of the plurality of second forming features 204.

In one or more examples, the plurality of second forming features 204 form the second interface surface 246 that is substantially continuous for contact with the composite ply 312. For example, each one of the plurality of second forming feature 204 abuts a directly adjacent one of the plurality of second forming features 204 to form the second interface surface 246 for contact with the composite ply 312.

In one or more examples, the composite forming system 300 is one of a plurality of sub-systems of a larger automated composite manufacturing system. Each one of the plurality of sub-systems facilitates and corresponds to a different fabrication operation associated with the manufacture of the composite structure 314 (e.g., a composite part). The sub-systems of the automated composite manufacturing system are interlinked and cooperate to automate at least a portion of the fabrication process.

For example, the automated composite manufacturing system utilizes a plurality of semi-automated or fully automated sub-systems to perform ply-by-ply formation and compaction of individual composite plies on the forming tool 308. For the purpose of the present disclosure, ply-by-ply formation refers to sequential layup of a number of composite plies 312 on the forming tool 308 according to a predetermined sequence. For the purpose of the present disclosure, layup refers to placement of the composite ply 312 on at least a portion of the forming tool 308 or on at least a portion of the prior formed composite ply 312-1, compaction of the composite ply 312 against the forming surface 310 of the forming tool 308 or against at least a portion of the prior formed composite ply 312-1, and formation of at least a portion of the composite ply 312 over at least a portion of the forming surface 310 or over at least a portion of the prior formed composite ply 312-1. During or subsequent to layup, the number of composite plies 312 is compacted on the forming tool 308, such as individually after each composite ply 312 has been laid down or after more than one composite ply 312 had been laid down.

Figure 13:
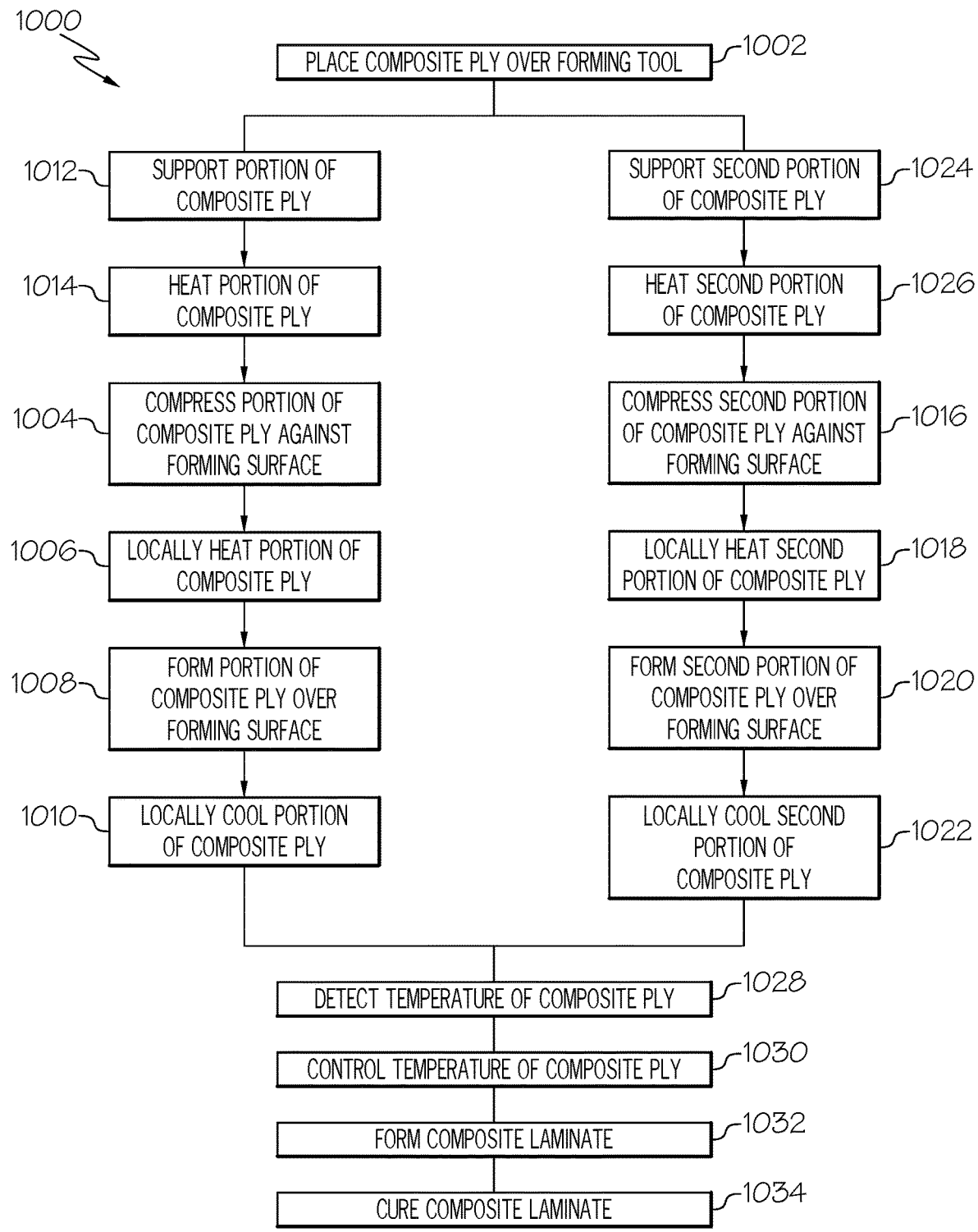
FIG. 13 is a flow diagram of an example of a method for forming a composite.

Referring now to FIG. 13, which illustrates an example of the method 1000 for forming the composite structure 314 on the forming tool 308. Examples of the method 1000 enable automated, or at least partially automated, fabrication of the composite laminate 328 on the forming tool 308. More particularly, examples of the method 1000 enable automated, or at least partially automated, formation of at least one composite ply 312 over the forming surface 310 of the forming tool 308 or over the prior formed composite ply 312-1 for manufacture of the composite structure 314.

Referring to FIGS. 1 and 13, in one or more examples, implementations of the method 1000 enable forming the composite laminate 328 on the forming surface 310 of the forming tool 308 using the composite forming apparatus 100 and/or the composite forming system 300 disclosed herein.

Referring generally to FIGS. 1-12 and particularly to FIG. 13, in one or more examples, the method 1000 includes a step of (block 1002) placing the composite ply 312 over the forming tool 308 or over the prior formed composite ply 312-1. In one or more examples, according to the method 1000, the step of (block 1002) placing the composite ply 312 over the forming surface 310 of the forming tool 308 includes a step of positioning the composite ply 312 over the forming surface 310 of the forming tool 308 or over the prior formed composite ply 312-1. Positioning the composite ply 312 over the forming surface 310 or over the prior formed composite ply 312-1 may be performed manually or automatically by a programmable machine.

In one or more examples, the method 1000 includes a step of (block 1004) compressing a portion of the composite ply 312. In one or more examples, the portion 350 of the composite ply 312 is compressed against the forming surface 310 of the forming tool 308 (e.g., as shown in FIG. 2). In one or more examples, the portion 350 of the composite ply 312 is compressed against the prior formed composite ply 312-1 (as shown in FIG. 3). In one or more examples, according to the method 1000, the step of (block 1004) compressing the portion of the composite ply 312 is performed using the composite forming apparatus 100 and/or the composite forming system 300.

In one or more examples, according to the method 1000, the step of (block 1004) compressing the portion (e.g., portion 350 as shown in FIGS. 2 and 3) of the composite ply 312 includes a step of positioning the forming feature 104 in contact with the composite ply 312 using the end effector 102. In one or more examples, the end effector 102 moves the forming feature 104 relative to the forming tool 308 to apply the compaction force 144 to the portion of the composite ply 312. The compaction force 144 compresses the composite ply 312 against the forming surface 310 (e.g., as shown in FIG. 2) or against the prior formed composite ply 312-1 (e.g., as shown in FIG. 3).

In one or more examples, the method 1000 includes a step of (block 1006) locally heating the portion of the composite ply 312 being compressed via conduction. In one or more examples, as shown in FIG. 2, the portion of the composite ply 312 that is heated is the portion 350 of the composite ply 312 that is being swept over the forming surface 310 of the forming tool 308. In one or more examples, as shown in FIG. 3, the portion of the composite ply 312 that is heated is the portion 350 of the composite ply 312 that is being swept over the prior formed composite ply 312-1. In one or more examples, according to the method 1000, the step of (block 1006) locally heating the portion of the composite ply 312 is performed using the composite forming apparatus 100 and/or the composite forming system 300.

In one or more examples, according to the method 1000, the step of (block 1006) locally heating the portion of the composite ply 312 includes a step of heating the forming feature 104 using the heating element 112 that is coupled to the forming feature 104. Heat is transferred from the heating element 112 to the forming feature 104 via conduction. The step of (block 1006) locally heating the portion of the composite ply 312 also includes a step of heating the portion of the composite ply 312 via conduction using the forming feature 104. Heat is transferred from the forming feature 104 to the portion of the composite ply 312 via conduction.

Locally heating the portion of the composite ply 312 beneficially prepares the composite ply 312 for compaction and formation over the forming surface 310 or over the prior formed composite ply 312-1. For example, locally heating the composite ply 312 using the forming feature 104 before and/or while forming of the composite ply 312 over the forming surface 310 or over the prior formed composite ply 312-1 softens the composite ply 312 and facilitates improved adhesion of the composite ply 312 to the forming surface 310 or the prior formed composite ply 312-1. Additionally, locally heating the portion of the composite ply 312 being formed increases processing speeds.

In one or more examples, the method 1000 includes a step of (block 1008) forming the portion of the composite ply 312. In one or more examples, the step of (block 1008) forming the portion of the composite ply 312 is performed while compressing (e.g., block 1004) and locally heating (e.g., block 1006) the portion of the composite ply 312. In one or more examples, as shown in FIG. 2, the portion 350 of the composite ply 312 is formed over a portion of the forming surface 310 of the forming tool 308. In one or more examples, as shown in FIG. 3, the portion 350 of the composite ply 312 is formed over a portion of the prior formed composite ply 312-1. In one or more examples, according to the method 1000, the step of (block 1008) forming the portion of the composite ply 312 is performed using the composite forming apparatus 100 and/or the composite forming system 300.

In one or more examples, according to the method 1000, the step of (block 1008) forming the portion of the composite ply 312 includes a step of forming the portion of the composite ply 312 over the portion of the forming surface 310 of the forming tool 308 or over a portion of the prior formed composite ply 312-1 using the forming feature 104 while locally heating (e.g., block 1006) and compressing (e.g., block 1004) the portion of the composite ply 312 using the forming feature 104.

In one or more examples, the step of (block 1008) forming the portion of the composite ply 312 includes a step of applying the compaction force 144 to the portion of the composite ply 312 using the forming feature 104 and a step of moving the forming feature 104 relative to the composite ply 312. In one or more examples, the step of moving the forming feature 104 relative to the composite ply 312 includes a step of moving the end effector 102 relative to the forming tool 308 or relative to prior formed composite ply 312-1, for example using the movement mechanism 302 and/or the actuator 110.

With the forming feature 104 in contact with the composite ply 312, moving the forming feature 104 sweeps the forming feature 104 over the portion of the composite ply 312 and, consequently, sweeps the portion (e.g., portion 350) of the composite ply 312 over the forming surface 310 of the forming tool 308 (e.g., as shown in FIG. 2) or sweeps the portion (e.g., portion 350) of the composite ply 312 over a portion of the prior formed composite ply 312-1 (e.g., as shown in FIG. 3). Accordingly, a compression nip is formed by (e.g., between) the forming feature 104 and the forming surface 310 of the forming tool 308 or the prior formed composite ply 312-1 as the forming feature 104 moves across the composite ply 312. The composite ply 312 is locally heated about the compression nip from one direction by the forming feature 104.

In one or more examples, the method 1000 includes a step of (block 1010) locally cooling the portion of the composite ply 312 via conduction. Generally, the step of (block 1010) locally cooling is performed after forming (e.g., block 1008) the portion of the composite ply 312. In one or more examples, as shown in FIG. 2, the portion of the composite ply 312 that is cooled is the portion 350 of the composite ply 312 that is swept over the forming surface 310 of the forming tool 308. In one or more examples, as shown in FIG. 3, the portion of the composite ply 312 that is cooled is the portion 350 of the composite ply 312 that is swept over the prior formed composite ply 312-1. In one or more examples, according to the method 1000, the step of (block 1010) locally cooling the portion of the composite ply 312 is performed using the composite forming apparatus 100 and/or the composite forming system 300.

In one or more examples, according to the method 1000, step of (block 1010) locally cooling the portion of the composite ply 312 includes a step of cooling the forming feature 104 using the cooling element 124 that is coupled to the forming feature 104. Heat is transferred from the forming feature 104 to the cooling element 124 via conduction. The step of (block 1010) locally cooling the portion of the composite ply 312 also includes a step of cooling the portion of the composite ply 312 via conduction using the forming feature 104 after forming the portion of the composite ply 312. Heat is transferred from the composite ply 312 to the forming feature 104 via conduction.

Locally cooling the composite ply 312 after forming the composite ply 312 over the forming surface 310 or over the prior formed composite ply 312-1 can beneficially increase forming speed of the composite laminate 328. For example, actively cooling each layer of the prior formed composite ply 312-1 using the forming feature 104 after formation and before formation of each subsequent layer of the composite ply 312 can prevent heat from building up within the composite laminate 328 during formation.

In one or more examples, the method 1000 includes a step of (block 1012) supporting the portion (e.g., portion 350) of the composite ply 312 (e.g., as shown in FIGS. 2 and 3), which extends beyond the edge 316 of the forming tool 308, before and/or while forming (e.g., block 1008) the portion of the composite ply 312 over a portion of the forming surface 310 of the forming tool 308 or over a portion of prior formed composite ply 312-1. In one or more examples, according to the method 1000, the step of (block 1012) supporting the portion of the composite ply 312 is performed using the composite forming apparatus 100 and/or the composite forming system 300.

In one or more examples, according to the method 1000, the step of (block 1012) supporting the portion of the composite ply 312 includes a step of supporting the portion of the composite ply 312, which extends beyond the edge 316 of the forming tool 308, using the ply support member 106. The portion of the composite ply 312 is supported by the ply support member 106 before and/or while forming (e.g., block 1008) the portion of the composite ply 312 over the portion of the forming surface 310 of the forming tool 308 or over prior formed composite ply 312-1 using the forming feature 104.

Supporting the portion of the composite ply 312 that extends beyond the edge of the forming tool 308 can beneficially prevent wrinkling of the composite ply 312 while forming the composite ply 312 over the forming surface 310 or while forming the composite ply 312 over prior formed composite ply 312-1. For example, supporting the portion of the composite ply 312 on the ply support member 106 maintains the composite ply 312 in an appropriate position for the forming feature 104 to form the composite ply 312.

In one or more examples, the method 1000 includes a step of (block 1014) heating the portion of the composite ply 312 via conduction before compressing (e.g., block 1004) the composite ply 312 against the forming surface 310 or against prior formed composite ply 312-1 and/or before forming (e.g., block 1008) the portion of the composite ply 312 over a portion of the forming surface 310 or over a portion of prior formed composite ply 312-1. In one or more examples, the step of (block 1014) heating the portion of the composite ply 312 is performed using the composite forming apparatus 100 and/or the composite forming system 300.

In one or more examples, according to the method 1000, the step of (block 1014) heating the portion of the composite ply 312 includes a step of heating the portion of the composite ply 312 via conduction using the ply support member 106. The portion of the composite ply 312 being heated is at least the portion of the composite ply 312 being supported by the ply support member 106. As an example, as illustrated in FIG. 2, the portion 350 of the composite ply 312 is heated by the ply support member 106 before and/or while forming (e.g., block 1008) the portion 350 of the composite ply 312 over a portion of the forming surface 310 of the forming tool 308 using the forming feature 104. As an example, and as illustrated in FIG. 3, the portion 350 of the composite ply 312 is heated by the ply support member 106 before and/or while forming (e.g., block 1008) the portion 350 of the composite ply 312 over at least a portion of prior formed composite ply 312-1 using the forming feature 104.

Heating the portion of the composite ply 312 that extends beyond the edge 316 of the forming tool 308 and that is supported by the ply support member 106 beneficially prepares the composite ply 312 for formation over the forming surface 310 or over prior formed composite ply 312-1. For example, heating the composite ply 312 before and/or while forming the composite ply 312 softens the composite ply 312 and facilitates improved adhesion of the composite ply 312 to the forming surface 310 or prior formed composite ply 312-1.

In one or more examples, the method 1000 includes a step of heating at least a portion of the composite ply 312 using the tool-heater 372 of the forming tool 308 via conduction. In one or more examples, a portion of the composite ply 312 is heated via conduction using the forming tool 308 from a direction that is opposite the forming feature 104 (e.g., as shown in FIG. 2). Heating the composite ply 312 using the forming tool 308 may help tack the composite ply 312 into the desired shape after forming. In one or more examples, the method 1000 includes a step of heating at least a portion of the prior formed composite ply 312-1 via conduction using the forming tool 308 while forming the composite ply 312 over the prior formed composite ply 312-1 (e.g., as shown in FIG. 3). Heating the prior formed composite ply 312-1 using the forming tool 308 may help increase adhesion between the composite ply 312 and the prior formed composite ply 312-1 and tack the composite ply 312 into the desired shape after forming.

Referring generally to FIGS. 1 and 7-10 and particularly to FIG. 13, in one or more examples, the method 1000 includes a step of (block 1016) compressing a second portion of the composite ply 312. In one or more examples, the second portion 352 of the composite ply 312 is compressed against the forming surface 310 of the forming tool 308 (e.g., as shown in FIG. 10). In one or more examples, the second portion 352 of the composite ply 312 is compressed against the prior formed composite ply 312-1. In one or more examples, according to the method 1000, the step of (block 1016) compressing the second portion of the composite ply 312 against the forming surface 310 or against the prior formed composite ply 312-1 is performed using the composite forming apparatus 100 and/or the composite forming system 300.

In one or more examples, according to the method 1000, the step of (block 1016) compressing the second portion (e.g., second portion 352 as shown in FIG. 10) of the composite ply 312 includes a step of positioning the second forming feature 204 in contact with the composite ply 312 using the second end effector 202. In one or more examples, the second end effector 202 moves the second forming feature 204 relative to the forming tool 308 to apply the second compaction force 244 to the second portion of the composite ply 312. The second compaction force 244 compresses the composite ply 312 against the forming surface 310 or against prior formed composite ply 312-1.

In one or more examples, the method 1000 includes a step of (block 1018) locally heating the second portion of the composite ply 312 being compressed via conduction. In one or more examples, as shown in FIG. 10, the second portion of the composite ply 312 that is heated is the second portion 352 of the composite ply 312 that is being swept over the forming surface 310 of the forming tool 308. In one or more examples, the second portion of the composite ply 312 that is heated is the second portion of the composite ply 312 that is being swept over prior formed composite ply 312-1. In one or more examples, according to the method 1000, the step of (block 1018) locally heating the second portion of the composite ply 312 is performed using the composite forming apparatus 100 and/or the composite forming system 300.

In one or more examples, according to the method 1000, step of (block 1018) locally heating the second portion of the composite ply 312 includes a step of heating the second forming feature 204 using the second heating element 212 that is coupled to the second forming feature 204. Heat is transferred from the second heating element 212 to the second forming feature 204 via conduction. The step of (block 1018) locally heating the second portion of the composite ply 312 also includes a step of heating the second portion of the composite ply 312 via conduction using the second forming feature 204. Heat is transferred from the second forming feature 204 to the composite ply 312 via conduction.

Locally heating the second portion of the composite ply 312 beneficially prepares the composite ply 312 for compaction against and formation over the forming surface 310 or over the prior formed composite ply 312-1. For example, locally heating the composite ply 312 using the second forming feature 204 before and/or while forming of the composite ply 312 over the forming surface 310 or over the prior formed composite ply 312-1 softens the composite ply 312 and facilitates improved adhesion of the composite ply 312 to the forming surface 310 or the prior formed composite ply 312-1. Additionally, locally heating the portion of the composite ply 312 being formed increases processing speeds.

In one or more examples, the method 1000 includes a step of (block 1020) forming the second portion of the composite ply 312. In one or more examples, the step of (block 1020) forming the second portion of the composite ply 312 is performed while compressing (e.g., block 1016) and locally heating (e.g., block 1018) the second portion of the composite ply 312. In one or more examples, as shown in FIG. 10, the second portion 352 of the composite ply 312 is formed over a second portion of the forming surface 310 of the forming tool 308. In one or more examples, the second portion of the composite ply 312 is formed over at least a second portion of the prior formed composite ply 312-1. In one or more examples, according to the method 1000, the step of (block 1020) forming the second portion of the composite ply 312 is performed using the composite forming apparatus 100 and/or the composite forming system 300.

In one or more examples, according to the method 1000, the step of (block 1020) forming the second portion of the composite ply 312 includes a step of forming the second portion of the composite ply 312 over the second portion of the forming surface 310 of the forming tool 308 or over at least a second portion of prior formed composite ply 312-1 using the second forming feature 204 while locally heating (e.g., block 1018) and compressing (e.g., block 1016) the second portion of the composite ply 312 using the second forming feature 204.

In one or more examples, the step of the step of (block 1020) forming the second portion of the composite ply 312 includes a step of applying the second compaction force 244 to the second portion of the composite ply 312 using the second forming feature 204 and a step of moving the second forming feature 204 relative to the composite ply 312. In one or more examples, the step of moving the second forming feature 204 relative to the composite ply 312 includes a step of moving the second end effector 202 relative to the forming tool 308 or relative to the prior formed composite ply 312-1, for example using the movement mechanism 302 and/or the second actuator 210.

With the second forming feature 204 in contact with the composite ply 312, moving the second forming feature 204 sweeps the second forming feature 204 over the second portion of the composite ply 312 and, consequently, sweeps the second portion (e.g., second portion 352) of the composite ply 312 over the forming surface 310 of the forming tool 308 (e.g., as shown in FIG. 10) or sweeps the second portion of the composite ply 312 over a second portion of prior formed composite ply 312-1. Accordingly, a second compression nip is formed by (e.g., between) the second forming feature 204 and the forming surface 310 of the forming tool 308 or the prior formed composite ply 312-1 as the second forming feature 204 moves across the composite ply 312. The composite ply 312 is locally heated about the second compression nip from one direction by the second forming feature 204.

In one or more examples, the method 1000 includes a step of (block 1022) locally cooling the second portion of the composite ply 312 via conduction. Generally, the step of (block 1022) locally cooling is performed after forming (e.g., block 1020) the second portion of the composite ply 312. In one or more examples, as shown in FIG. 10, the second portion of the composite ply 312 that is cooled is the second portion 352 of the composite ply 312 that is swept over the forming surface 310 of the forming tool 308. In one or more examples, the second portion of the composite ply 312 that is cooled is the second portion of the composite ply 312 that is swept over the prior formed composite ply 312-1. In one or more examples, according to the method 1000, the step of (block 1022) locally cooling the second portion of the composite ply 312 is performed using the composite forming apparatus 100 and/or the composite forming system 300.

In one or more examples, according to the method 1000, the step of (block 1022) locally cooling the second portion of the composite ply 312 includes a step of cooling the second forming feature 204 using the second cooling element 224 that is coupled to the second forming feature 204. Heat is transferred from the second forming feature 204 to the second cooling element 224 via conduction. The step of (block 1022) locally cooling the second portion of the composite ply 312 also includes a step of cooling the second portion of the composite ply 312 via conduction using the second forming feature 204 after forming the second portion of the composite ply 312. Heat is transferred from the composite ply 312 to the second forming feature 204 via conduction.

In one or more examples, the method 1000 includes a step of (block 1024) supporting the second portion (e.g., second portion 352) of the composite ply 312, which extends beyond the second edge 326 of the forming tool 308, before and/or while forming (e.g., block 1020) the second portion of the composite ply 312 over a second portion of the forming surface 310 of the forming tool 308 or over a second portion of prior formed composite ply 312-1. In one or more examples, according to the method 1000, the step of (block 1024) supporting the second portion of the composite ply 312 is performed using the composite forming apparatus 100 and/or the composite forming system 300.

In one or more examples, according to the method 1000, the step of (block 1024) supporting the second portion of the composite ply 312 includes a step of supporting the second portion of the composite ply 312, which extends beyond the second edge 326 of the forming tool 308, using the second ply support member 206. The second portion of the composite ply 312 is supported by the second ply support member 206 before and/or while forming (e.g., block 1020) the second portion of the composite ply 312 over the second portion of the forming surface 310 of the forming tool 308 or over prior formed composite ply 312-1 using the second forming feature 204.

In one or more examples, the method 1000 includes a step of (block 1026) heating the second portion of the composite ply 312 via conduction before compressing (1016) the composite ply 312 against the forming surface 310 of the forming tool 308 or against prior formed composite ply 312-1 and/or before forming (1020) the second portion of the composite ply 312 over a second portion of the forming surface 310 of the forming tool 308 or over a second portion of the prior formed composite ply 312-1. In one or more examples, the step of (block 1026) heating the second portion of the composite ply 312 is performed using the composite forming apparatus 100 and/or the composite forming system 300.

In one or more examples, according to the method 1000, the step of (block 1024) heating the second portion of the composite ply 312 includes a step of heating the second portion of the composite ply 312 via conduction using the second ply support member 206. The second portion of the composite ply 312 being heated is at least the portion of the composite ply 312 being supported by the second ply support member 206. As an example, as illustrated in FIG. 10, the second portion 352 of the composite ply 312 is heated by the second ply support member 206 before and/or while forming (e.g., block 1020) the second portion 352 of the composite ply 312 over a second portion of the forming surface 310 of the forming tool 308 using the second forming feature 204. As an example, the second portion of the composite ply 312 is heated by the second ply support member 206 before and/or while forming (e.g., block 1020) the second portion of the composite ply 312 over a second portion of prior formed composite ply 312-1 using the second forming feature 204.

Referring generally to FIGS. 1-10 and particularly to FIG. 13, in one or more examples, the method 1000 includes a step of (block 1028) detecting a temperature of the composite ply 312 and a step of (block 1030) selectively controlling the temperature of the composite ply 312, for example, before, while, and/or after forming (1008) the portion of the composite ply 312 and forming (1020) the second portion of the composite ply 312. In one or more examples, according to the method 1000, the step of (block 1028) detecting the temperature and the step of (block 1030) selectively controlling the temperature of the composite ply 312 are performed using the using the composite forming apparatus 100 and/or the composite forming system 300.

In one or more examples, the step of (block 1028) detecting and the step of (block 1030) controlling the temperature of the composite ply 312 are performed before, during, and/or after the step of (block 1014) and the step of (block 1026) heating the composite ply 312.

In one or more examples, the step of (block 1028) detecting and the step of (block 1030) controlling the temperature of the composite ply 312 are performed before, during, and/or after the step of (block 1004) and the step of (block 1016) compressing the composite ply 312.

In one or more examples, the step of (block 1028) detecting and the step of (block 1030) controlling the temperature of the composite ply 312 are performed before, during, and/or after the step of (block 1006) and the step of (block 1018) locally heating the composite ply 312.

In one or more examples, the step of (block 1028) detecting and the step of (block 1030) controlling the temperature of the composite ply 312 are performed before, during, and/or after the step of (block 1008) and the step of (block 1020) forming the composite ply 312.

In one or more examples, the step of (block 1028) detecting and the step of (block 1030) controlling the temperature of the composite ply 312 are performed before, during, and/or after the step of (block 1010) and the step of (block 1022) locally cooling the composite ply 312.

In one or more examples, controlling the temperature of the composite ply 312 is achieved by controlling the amount of heat being added to the composite ply 312, for example, by the forming feature 104, the second forming feature 204, the ply support member 106, the second ply support member 206, the environment heater 320, and/or the additional heater 370. In one or more examples, controlling the temperature of the composite ply 312 is achieved by controlling the amount of heat being removed from the composite ply 312, for example, by the forming feature 104 and/or the second forming feature 204.

In one or more examples, according to the method 1000, the step of (block 1028) detecting the temperature of the composite ply 312 includes a step of detecting at least one of a temperature the forming feature 104 and a temperature of the portion of the composite ply 312 using the temperature sensor 130. In one or more examples, according to the method 1000, the step of (block 1028) detecting the temperature of the composite ply 312 includes a step of detecting at least one of a temperature the second forming feature 204 and a temperature of the second portion of the composite ply 312 using the second temperature sensor 230.

In one or more examples, according to the method 1000, the step of (block 1030) selectively controlling the temperature of the composite ply 312 includes a step of selectively controlling at least one of the temperature of the forming feature 104 and the temperature of the portion of the composite ply 312 based on the temperature signal 138 provided by the temperature sensor 130. In one or more examples, according to the method 1000, the step of (block 1030) selectively controlling the temperature of the composite ply 312 includes a step of selectively controlling at least one of the temperature of the second forming feature 204 and the temperature of the second portion of the composite ply 312 based on the second temperature signal 238 provided by the second temperature sensor 230.

In one or more examples, the method 1000 includes a step of maintaining the compaction force 144, applied to the portion of the composite ply 312, at a substantially constant magnitude while forming the portion of the composite ply 312. In one or more examples, the step of maintaining the compaction force 144 is performed using the composite forming apparatus 100 and/or the composite forming system 300.

In one or more examples, according to the method 1000, the step of maintaining the compaction force 144 includes a step of detecting a force applied to the forming feature 104 using the sensor 140 and a step of selectively controlling the compaction force 144 applied to the portion of the composite ply 312 by the forming feature 104 at a substantially constant magnitude based on the sensor signal 142 provided by the sensor 140.

In one or more examples, the method 1000 includes a step of maintaining the second compaction force 244, applied to the second portion of the composite ply 312, at a substantially constant magnitude while forming the second portion of the composite ply 312. In one or more examples, the step of maintaining the second compaction force 244 is performed using the composite forming apparatus 100 and/or the composite forming system 300.

In one or more examples, according to the method 1000, the step of maintaining the second compaction force 244 includes a step of detecting a force applied to the second forming feature 204 using the second sensor 240 and a step of selectively controlling the second compaction force 244, applied to the second portion of the composite ply 312 by the forming feature 104, at a substantially constant magnitude based on the second sensor signal 242 provided by the second sensor 240.

In one or more examples, the method 1000 includes a step of holding the composite ply 312 while forming the portion of the composite ply 312 over the portion of the forming surface 310 of the forming tool 308 or over the portion of prior formed composite ply 312-1 and/or while forming the second portion of the composite ply 312 over the second portion of the forming surface 310 of the forming tool 308 or over the second portion of prior formed composite ply 312-1.

In one or more examples, according to the method 1000, the step of holding the composite ply 312 includes a step of pressing the composite ply 312 against the forming surface 310 or against prior formed composite ply 312-1 using the stomp foot 324. In one or more examples, the composite ply 312 is held (e.g., clamped) in place using the stomp foot 324 while forming the portion of the composite ply 312 over the portion of the forming surface 310 of the forming tool 308 using the forming feature 104 and/or while forming the second portion of the composite ply 312 over the second portion of the forming surface 310 of the forming tool 308 using the second forming feature 204. In one or more examples, the composite ply 312 is held (e.g., clamped) in place using the stomp foot 324 while forming a portion of the composite ply 312 over a portion of prior formed composite ply 312-1 using the forming feature 104 and/or while forming a second portion of the composite ply 312 over a second portion of the prior formed composite ply 312-1 using the second forming feature 204.

In one or more examples, the method 1000 includes a step of (block 1032) forming the composite laminate 328 on the forming surface 310 of the forming tool 308. The composite laminate 328 includes at least one layer of the composite ply 312. In one or more examples, the method 1000 includes a step of (block 1034) curing the composite laminate 328 to fabricate (e.g., form) the composite structure 314 (e.g., as shown in FIG. 1). In one or more examples, the composite laminate 328 is cured on the forming tool 308. In one or more examples, the composite laminate 328 is transferred from the forming tool 308 to a cure tool and is cured on the cure tool.

In one or more examples, the steps (e.g., block 1002 through block 1030) of the method 1000 described above are repeated a number of times to form the composite laminate 328 (e.g., block 1032). For example, the method 1000 includes a step of placing at least one composite ply 312 over the prior formed composite ply 312-1. The method 1000 includes a step of locally heating a portion of the composite ply 312 via at least one of radiation and convection. The method 1000 includes a step of compressing the portion of the composite ply 312 against the prior formed composite ply 312-1. The method 1000 includes a step of forming the portion of the composite ply 312 over a portion of the prior formed composite ply 312-1 after heating the portion of the composite ply 312.

Referring to FIGS. 1 and 13, in one or more examples, the present disclosure is also directed to the composite forming apparatus 100 and/or the composite forming system 300 that is operated according to the method 1000 to enable forming the composite laminate 328 on the forming surface 310 of the forming tool 308.

Referring to FIG. 1, the present disclosure is further directed to the composite structure 314 that is formed on the forming surface 310 of the forming tool 308 using the composite forming apparatus 100 and/or the composite forming system 300 disclosed herein. Referring to FIG. 13, the present disclosure is additionally directed to the composite structure 314 that is formed according to the method 1000 disclosed herein.

In one or more examples, the composite structure 314 includes at least one layer of the composite ply 312 that is formed over the forming surface 310 of the forming tool 308 or over the prior formed composite ply 312-1 to fabricate the composite laminate 328. A portion of the composite ply 312 is heated by the forming feature 104 of the composite forming apparatus 100 via conduction while the portion of the composite ply 312 is formed over a portion of the forming surface 310 or over at least a portion of the prior formed composite ply 312-1 using the forming feature 104. In one or more examples, the portion of the composite ply 312 is cooled by the forming feature 104 via conduction after the portion of the composite ply 312 is formed over the portion of the forming surface 310 or over the prior formed composite ply 312-1. The composite laminate 328 is cured to form the composite structure 314.

Figure 14:
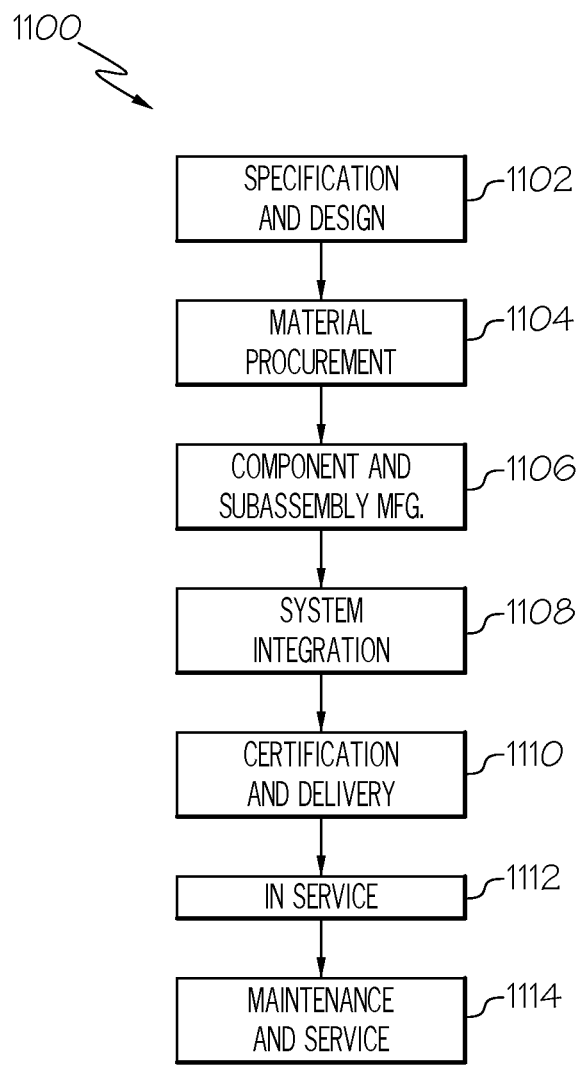
FIG. 14 is a flow diagram of an example of an aircraft manufacturing and service method.
Figure 15:
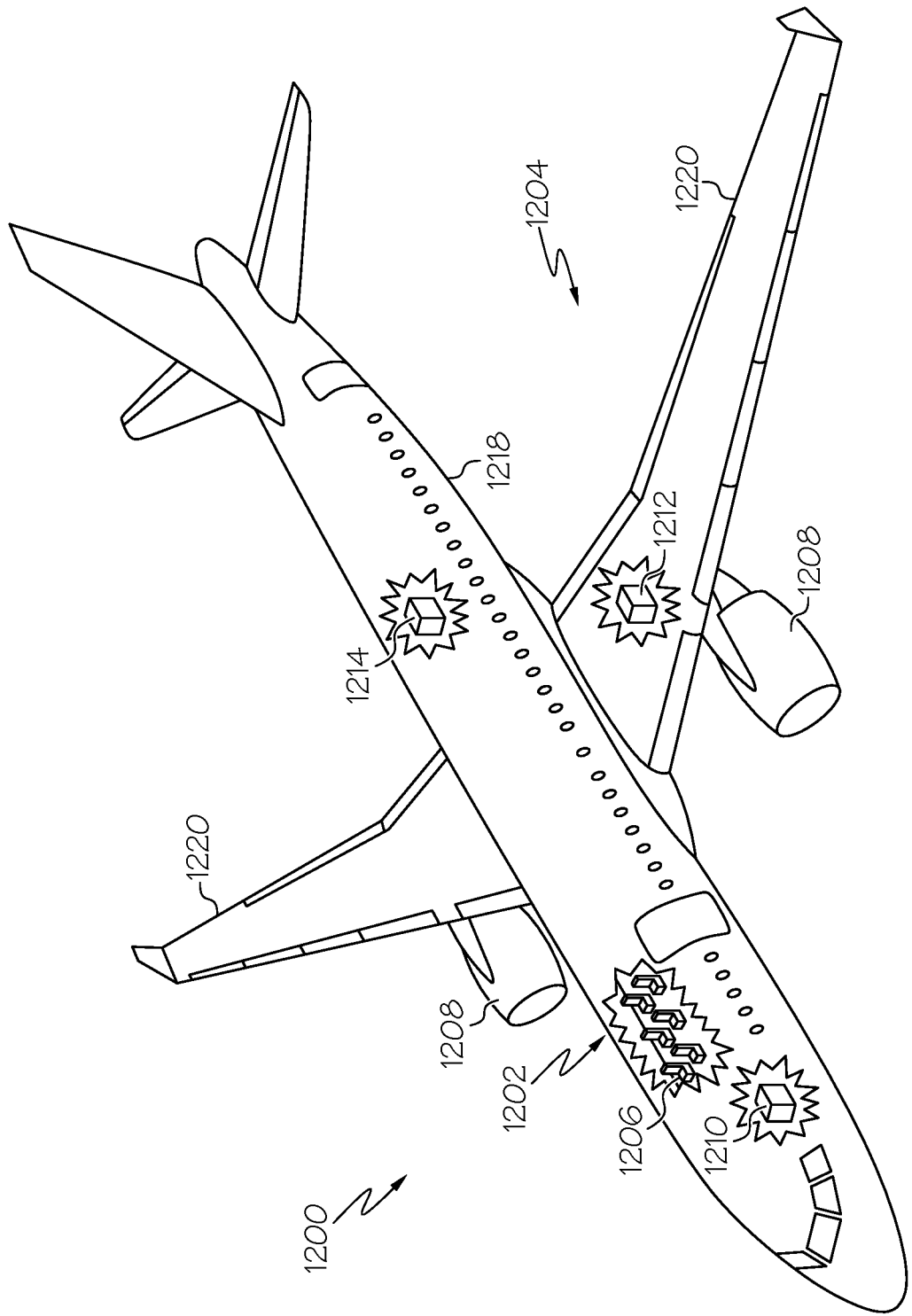
FIG. 15 is a schematic illustration of an example of an aircraft.

Referring now to FIGS. 14 and 15, examples of the composite forming apparatus 100, the composite forming system 300, the method 1000, and the composite structure 314 may be related to, or used in the context of, an aircraft manufacturing and service method 1100, as shown in the flow diagram of FIG. 14 and an aircraft 1200, as schematically illustrated in FIG. 15. For example, the aircraft 1200 and/or the aircraft production and service method 1100 may utilize the composite structure 314 that is made using the composite forming apparatus 100 or the composite forming system 300, described herein and illustrated in FIGS. 1-12, and/or according to the method 1000, described herein and illustrated in FIG. 13.

The present disclosure recognizes that composite structures can be advantageous in the manufacture of aircraft to decrease the weight of the aircraft and provide longer service life for various components of the aircraft. In manufacturing composite structures, layers of composite material are typically laid up on a tool. Often, each layer of composite material includes a fiber sheet that is infused or pre-impregnated with a matrix material. The different layers of composite material may be laid up in different orientations, and different numbers of layers may be used depending on the performance requirements of the composite structure being manufactured. Due to size, geometry, and/or complexity of composite structure, layup of the layers of composite material may be more difficult or more labor intensive than desired. The examples of the composite forming apparatus 100, the composite forming system 300, and the method 1000 improve upon production speed, conformity, and manufacturability of such composite structures.

Referring to FIG. 15, examples of the aircraft 1200 may include an airframe 1202 having the interior 1206. The aircraft 1200 also includes a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a flight control system, a guidance system, a weapons system, and the like. In one or more examples, the composite structure 314 made using the composite forming apparatus 100 or the composite forming system 300 and/or according to the method 1000 forms a component of the airframe 1202, such as a wing 1220, a fuselage 1218, a panel, a stringer, a spar, and the like.

Referring to FIG. 14, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 14 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the composite forming apparatus 100, the composite forming system 300, and the method 1000 shown and described herein may be employed during any one or more of the stages of the manufacturing and service method 1100 shown in the flow diagram illustrated by FIG. 11. In an example, manufacture of the composite structure 314 in accordance with the method 1000 and/or using the composite forming apparatus 100 or the composite forming system 300 may form a portion of component and subassembly manufacturing (block 1106) and/or system integration (block 1108). Further, the composite structure 314 manufactured in accordance with the method 1000 and/or using the composite forming apparatus 100 or the composite forming system 300 may be utilized in a manner similar to components or subassemblies prepared while the aircraft 1200 is in service (block 1112). Also, the composite structure 314 manufactured in accordance with the method 1000 and/or using the composite forming apparatus 100 or the composite forming system 300 may be utilized during system integration (block 1108) and certification and delivery (block 1110). Similarly, manufacture of the composite structure 314 in accordance with the method 1000 and/or using the composite forming apparatus 100 or the composite forming system 300 may be utilized, for example and without limitation, while the aircraft 1200 is in service (block 1112) and during maintenance and service (block 1114). For example, spare and or replacement composite parts may be fabricated in accordance with the method 1000 and/or using the composite forming apparatus 100 or the composite forming system 300, which may be installed due to a prescribed maintenance cycle or after a realization of damage to the composite part.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to structural component assemblies and systems and methods of making the same for other types of vehicles (e.g., land vehicles, marine vehicles, space vehicles, etc.) and standalone structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Temperatures (e.g., forming temperatures) and temperature ranges (e.g., forming temperature ranges) provided herein for heating the composite ply 312 are provided as examples and other temperatures or ranges of temperatures, for example, less than or greater than the example temperatures or ranges of temperatures, may be implemented without departing from the intended function of the forming apparatus 100 and the forming system 300, without departing from the intended implementation of the method 1000, and without departing from the principles and purpose of the present disclosure.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of the present disclosure, the term "position" of an item refers to a location of the item in three-dimensional space relative to a fixed reference frame and an angular orientation of the item in three-dimensional space relative to the fixed reference frame.

As used herein, the phrase "a number of" refers to one or more items.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-12 and 15, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-12 and 15, referred to above, need be included in every example and not all elements, features, and/or components described herein are necessarily depicted in each illustrative example. Accordingly, some of the elements, features, and/or components described and illustrated in FIGS. 1-12 and 15 may be combined in various ways without the need to include other features described and illustrated in FIGS. 1-12 and 15, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-12 and 15, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-12 and 15, and such elements, features, and/or components may not be discussed in detail herein with reference to each of FIGS. 1-12 and 15. Similarly, all elements, features, and/or components may not be labeled in each of FIGS. 1-12 and 15, but reference numerals associated therewith may be utilized herein for consistency.

In FIGS. 13 and 14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 13 and 14 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the composite forming apparatus 100, the composite forming system 300, the method 1000, and the composite structure 314 have been shown and described, modifications may occur to those skilled in the art upon reading the specification. The present application includes such modifications and is limited only by the scope of the claims.

What is claimed is:

1. A composite forming apparatus comprising:
an end effector;
a forming feature that is coupled to the end effector; and
a heating element that is coupled to the forming feature to heat the forming feature,
wherein:
the end effector moves the forming feature relative to a composite ply to form the composite ply over a forming tool or over a prior formed composite ply; and
the forming feature heats the composite ply via conduction.

2. The composite forming apparatus of claim 1, wherein the heating element is located within the forming feature.

3. The composite forming apparatus of claim 1, wherein:
the forming feature comprises a bladder; and
the bladder is inflatable.

4. The composite forming apparatus of claim 1, wherein the forming feature comprises a wiper.

5. The composite forming apparatus of claim 1, wherein the forming feature comprises a finger.

6. The composite forming apparatus of claim 1, further comprising a cooling element that cools the forming feature, wherein heat is transferred from the composite ply to forming feature via conduction.

7. The composite forming apparatus of claim 6, wherein the cooling element comprises:
a channel extending through the forming feature; and
a fluid that passes through the channel.

8. The composite forming apparatus of claim 1, further comprising a temperature sensor that detects a temperature of at least one of the forming feature and the composite ply.

9. The composite forming apparatus of claim 8, further comprising a control unit that is coupled to the heating element and the temperature sensor,
wherein the control unit selectively controls the heating element based on at least one of a temperature signal provided by the temperature sensor and an amperage supplied to the heating element.

10. The composite forming apparatus of claim 1, further comprising a ply support member that is movable relative to the forming tool and relative to the forming feature to support a portion of the composite ply that extends beyond an edge of the forming tool.

11. The composite forming apparatus of claim 10, wherein the ply support member heats the portion of the composite ply via conduction.

12. The composite forming apparatus of claim 1, wherein the heating element is a resistive heater.

13. The composite forming apparatus of claim 1, wherein the heating element is an induction heater.

14. The composite forming apparatus of claim 3, wherein:
the bladder comprises a tubular body, comprising an interior surface and an exterior surface; and
the heating element is coupled to the interior surface or is located between the interior surface and the exterior surface.

15. The composite forming apparatus of claim 1, wherein the forming feature is made of a fluoroelastomer.

16. The composite forming apparatus of claim 1, wherein the forming feature is made of silicone.

17. The composite forming apparatus of claim 6, wherein the cooling element is located within the forming feature.

18. The composite forming apparatus of claim 8, wherein the temperature sensor is a contact temperature sensor.

19. The composite forming apparatus of claim 8, wherein the temperature sensor is a non-contact temperature sensor.

20. The composite forming apparatus of claim 1, further comprising a stomp foot that is movable relative to the end effector to press the composite ply against the forming tool or against the prior formed composite ply.

* * * * *